(12) United States Patent
Li et al.

(10) Patent No.: US 8,797,382 B2
(45) Date of Patent: Aug. 5, 2014

(54) DYNAMICALLY RECONFIGURABLE HOLOGRAMS FOR GENERATING COLOR HOLOGRAPHIC IMAGES

(75) Inventors: Jingjing Li, Palo Alto, CA (US); Philip J. Kuekes, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 365 days.

(21) Appl. No.: 13/264,073

(22) PCT Filed: Apr. 13, 2009

(86) PCT No.: PCT/US2009/002284
§ 371 (c)(1), (2), (4) Date: Oct. 12, 2011

(87) PCT Pub. No.: WO2010/120260
PCT Pub. Date: Oct. 21, 2010

(65) Prior Publication Data
US 2013/0050409 A1    Feb. 28, 2013

(51) Int. Cl.
*G02F 1/1335*   (2006.01)
*G03H 1/14*   (2006.01)
*H04N 15/00*   (2006.01)

(52) U.S. Cl.
USPC ........ 348/41; 349/15; 359/9; 359/22; 359/23; 359/25; 359/32; 359/33; 359/35; 359/321; 977/762; 977/732

(58) Field of Classification Search
USPC ............ 348/41; 359/9, 22, 23, 25, 32, 33, 35, 359/321; 349/15; 977/932, 762
See application file for complete search history.

(56) References Cited

U.S. PATENT DOCUMENTS

| | | | |
|---|---|---|---|
| 5,696,552 A * | 12/1997 | Aritake et al. | 348/51 |
| 6,034,882 A * | 3/2000 | Johnson et al. | 365/103 |
| 7,046,892 B2 * | 5/2006 | Yoshikawa et al. | 385/129 |
| 2003/0234449 A1 * | 12/2003 | Aratani et al. | 257/758 |
| 2005/0017370 A1 * | 1/2005 | Stasiak | 257/777 |
| 2006/0050358 A1 * | 3/2006 | Bigman | 359/265 |
| 2006/0072178 A1 * | 4/2006 | Takabayashi et al. | 359/24 |
| 2006/0109540 A1 * | 5/2006 | Kueks et al. | 359/321 |
| 2007/0223074 A1 | 9/2007 | Harris | |
| 2008/0212921 A1 * | 9/2008 | Gaylord et al. | 385/14 |

FOREIGN PATENT DOCUMENTS

| | | |
|---|---|---|
| KR | 1020040076854 | 9/2004 |
| WO | WO-03/036993 | 5/2003 |

OTHER PUBLICATIONS

International Search Report and Written Opinion, PCT Application No. PCT/US2009/002284, Korean IPO, Jan. 13, 2010.

* cited by examiner

*Primary Examiner* — Christopher S Kelley
*Assistant Examiner* — Zhihan Zhou

(57) ABSTRACT

Various embodiments of the present invention are directed to negative refractive index-based holograms that can be electronically controlled and dynamically reconfigured to generate one or more color three-dimensional holographic images. In one aspect, a hologram comprises a phase-control layer having a plurality of phase modulation elements. The phase-modulation elements are configured with a negative effective refractive index and selectively transmit wavelengths associated with one of three primary color wavelength. The hologram also includes an intensity-control layer including a plurality of intensity-control elements. One or more color three-dimensional images can be produced by electronically addressing the phase-modulation elements and intensity-control elements in order to phase shift and control the intensity of light transmitted through the hologram. A method for generating a color holographic image using the hologram is also provided, as is a system for generating a color holographic image.

15 Claims, 20 Drawing Sheets

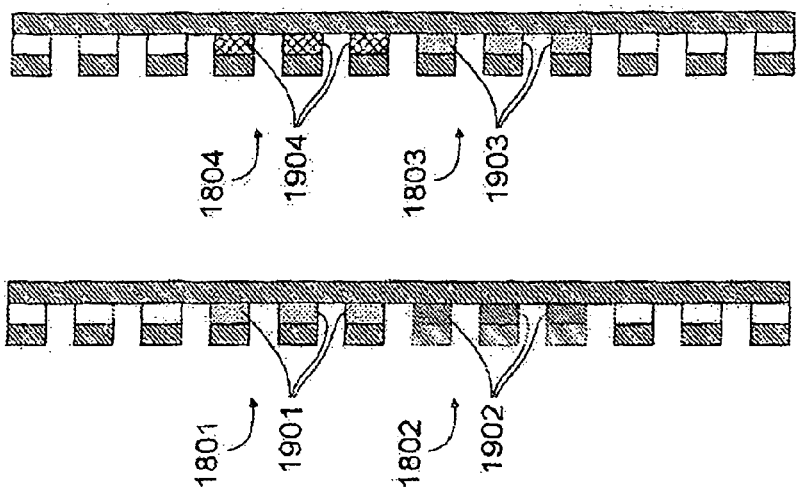
Figure 19A
Figure 19B
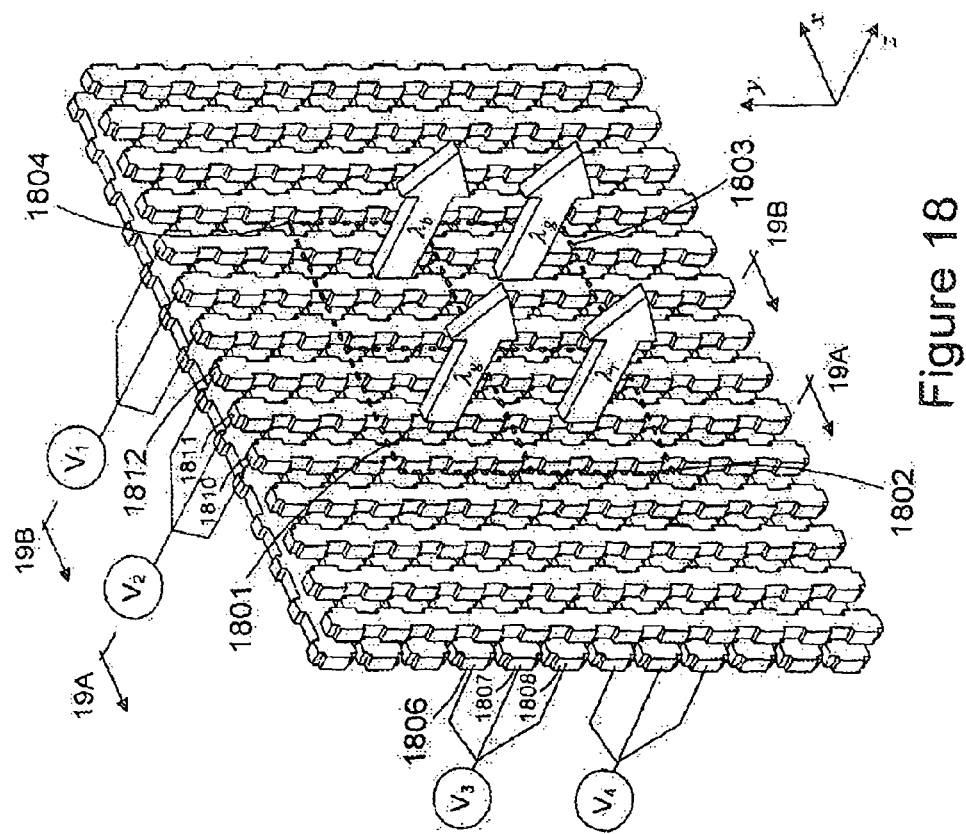
Figure 18

US 8,797,382 B2

DYNAMICALLY RECONFIGURABLE HOLOGRAMS FOR GENERATING COLOR HOLOGRAPHIC IMAGES

STATEMENT REGARDING FEDERALLY SPONSORED RESEARCH OR DEVELOPMENT

This invention has been made with government support under Contract No. HR0011-05-3-0002, awarded by Defense Advanced Research Projects Agency. The government has certain rights in the invention.

TECHNICAL FIELD

Embodiments of the present invention relate to holograms, and, in particular, to dynamically reconfigurable metamaterial-based holograms for generating three-dimensional color holographic images.

BACKGROUND

Photographs compress images of three-dimensional objects into flat, two-dimensional images displayed by a piece of paper, and television and motion pictures also compress images of moving three-dimensional objects into flat, moving, two-dimensional images displayed on a screen. Photographs, television, and motion pictures are examples of media that display three-dimensional objects as simply intensity mappings. In other words, when an image of a scene is ordinarily reproduced in a photograph or motion picture, a viewer does not see an accurate reproduction of the light scattered from the object, but instead a viewer sees a point-by-point record of just the square of the electromagnetic radiation amplitude reflected from the object (i.e., the irradiance). For example, the light reflected off a photograph carries with it information about the irradiance of the object displayed by the photograph but nothing about the electromagnetic wavefronts that were once scattered from the object during the taking of the photograph. As a result, a viewer only perceives a two-dimensional image of the object. Ideally, when the electromagnetic wavefronts scattered from an object can be reconstructed for a viewer, the viewer sees wavefronts that are indistinguishable from the wavefronts scattered from the original object. Thus, the viewer is able to perceives a reformed three-dimensional image of the object, as if the object was actually before the viewer.

Holography is a method of recording and showing a still three-dimensional holographic image of an object using a hologram and monochromatic light of a particular wavelength from a laser. A conventional hologram is a record of irradiance and wavefronts scattered from an object with respect to incident reference light. The hologram contains point-by-point information for reproducing a three-dimensional holographic image of the object, but is not an image of the object. FIG. 1A shows a conventional method for generating a hologram of an object 100. A laser 102 generates a coherent beam of light that is split by a beam splitter 104 to form an object beam and a reference beam. The object beam is reflected onto the object 100 by a mirror 106 and light scattered from the illuminated object 100 and the reference beam form an interference pattern on a photographic plate 108. The resulting interference pattern recorded on the photographic plate 108 is a hologram which contains the information used to reproduce the wavefronts of the object 100.

The hologram is used to reconstruct a three-dimensional holographic image of the object in approximately the same position that the object was in when it was recorded. FIG. 1B shows viewing a holographic image of the object 100. As shown in FIG. 1B, the laser 102 is positioned to illuminate a hologram 110 with monochromatic light stricking the hologram 110 at approximately the same angle as the reference beam. A viewer 112 looking through the hologram 110 sees a virtual holographic image of the object 100 suspended in space behind the hologram 110 in approximately the same position the original object 100 was in with respect to the photographic plate 108. The holographic image changes as the position and orientation of the viewer 112 changes. Thus the holographic image of the object 100 appears three dimensional to the viewer 112.

However, a hologram can only be used to produce a single still three-dimensional holographic image of an object. The systems used to generate holograms and holographic images are bulky, and the time and number of steps performed to produce a single hologram make current holographic methods and systems impractical for producing three-dimensional motion pictures of objects. In addition, the three-dimensional holographic images are typically monochromatic because light of a single wavelength is often used to generate the holographic image. Thus, it is desirable to have holographic methods and compact holographic systems that enable the production of three-dimensional color holographic images and color holographic motion pictures.

BRIEF DESCRIPTION OF THE DRAWINGS

FIG. 18 shows an isometric view of an enlarged region of the phase-control layer shown in FIG. 14 in accordance with embodiments of the present invention.

FIGS. 19A-19B show cross-sectional views of the phase-modulation elements shown in FIG. 18 in accordance with embodiments of the present invention.

DETAILED DESCRIPTION

Various embodiments of the present invention are directed to negative index materials that can be electronically controlled and dynamically reconfigured to generate wavefronts associated with one or more color holographic images. The negative index materials are crossbar arrays enabling electronic addressing of individual primary color phase-modulation elements. The phase-modulation elements are operated to produce transmission phase changes in incident primary color wavelengths that combine to reproduce the color wavefronts reflected from objects. Thus, holograms comprising an intensity-control layer that reproduces a reflected intensity mapping of objects and a crossbar array that reproduces reflected wavefronts of the objects can be operated in combination to generate color holographic images of the objects.

Negative Index Materials

Negative index materials ("NIMs"), also called metamaterials, are materials with optical properties resulting from the structure of the material rather than from the chemical composition of the material. Natural materials have positive permeability, $\mu$, and may have positive or negative dielectric permittivity $\in$, depending on the type of conductivity of the material and frequency ranges. In contrast, NIMs have simultaneously negative $\in$ and $\mu$ for certain portions of the electromagnetic spectrum, which results in optical properties that are different from those of ordinary composite materials. The optical properties of NIMs can be appreciated by comparing and contrasting the optical properties of NIMs with the optical properties of ordinary composite materials, as described in *Electrodynamics of Metamaterials*, by A. K. Sarychev and V. M. Shalaev (World Scientific, New York, 2007). For example, consider Maxwell's first-order differential equations for an electromagnetic wave propagating in an ordinary composite material with a time harmonic field as follows:

$$\nabla \times \vec{E} = -j\omega\mu\vec{H}$$

$$\nabla \times \vec{H} = j\omega\in\vec{E}$$

where $\vec{E}$ is the electric field component, $\vec{H}$ is the magnetic field component, $j=\sqrt{-1}$, and $\omega$ is the angular frequency. The solutions of these equations are the plane-wave fields:

$$\vec{E} = \vec{E}_0 \exp(-j\vec{k}_o \cdot \vec{r})$$

$$\vec{H} = \vec{H}_0 \exp(-j\vec{k}_o \cdot \vec{r})$$

Figure 1A:
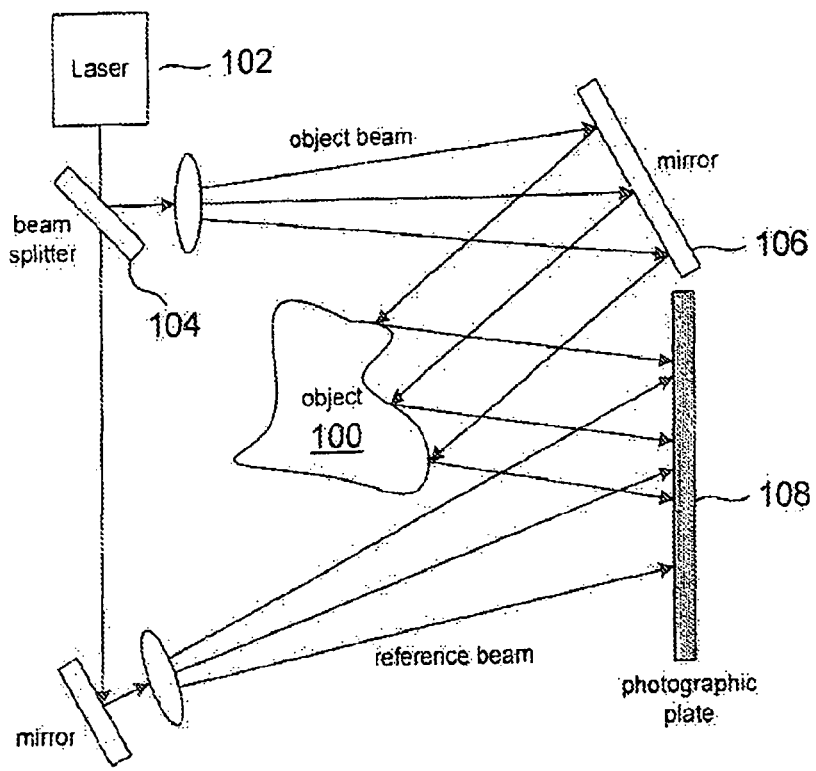
FIGS. 1A-1B show schematic representations of generating a holographic image of an object.
Figure 1B:
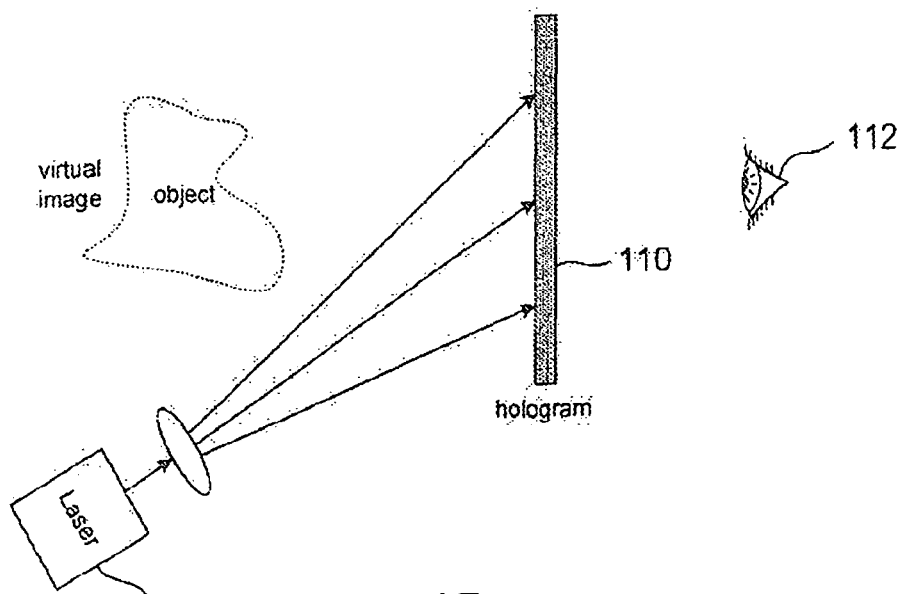
Figure 2A:
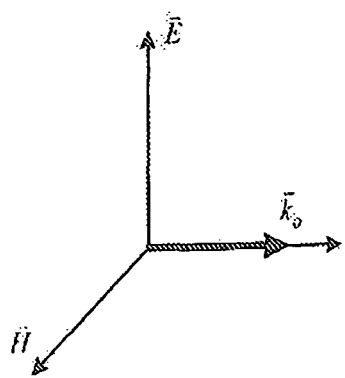
FIGS. 2A-2B show wave and Poynting vector directions for electromagnetic waves propagating in an ordinary right-handed medium.
Figure 2B:
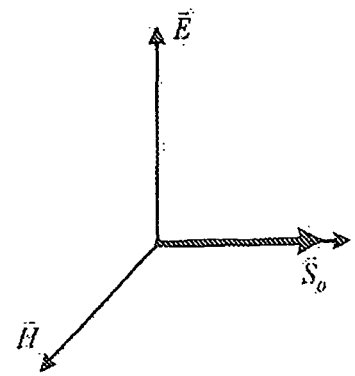

Substituting the Plane-Wave Equations into Maxwell's First Order Differential Equations gives the relations:

$$\vec{k}_o \times \vec{E} = \omega\mu\vec{H}$$

$$\vec{k}_o \times \vec{H} = -\omega\in\vec{E}$$

where $\vec{k}_o$ is a wavevector indicating the direction an electromagnetic wave propagates within a composite material. FIG. 2A shows the spatial relationship and relative orientation of the vectors $\vec{E}$, $\vec{H}$, and $\vec{k}_o$ and reveals that for an ordinary composite material with positive $\in$ and $\mu$, the vectors $\vec{E}$, $\vec{H}$, and $\vec{k}_o$ form an orthogonal, right-handed system of vectors. In addition, the direction of the time-averaged energy flux of the electromagnetic wave is given by the real component of the Poynting vector:

$$\vec{S}_o = \frac{1}{2}\text{Re}(\vec{E} \times \vec{H}^*)$$

which, as shown in FIG. 2B, reveals that the vectors $\vec{E}$, $\vec{H}$, and $\vec{S}_o$ also form an orthogonal, right-handed vector system. In other words, FIGS. 2A and 2B, show that for an electromagnetic wave propagating through a ordinary composite material, the propagation direction identified by the wavevector $\vec{k}_o$ and the direction of the energy carried by the electromagnetic wave identified by the Poynting vector $\vec{S}_o$ are the same.

Figure 3A:
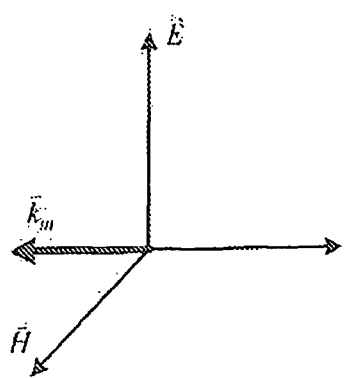
FIGS. 3A-3B show wave and Poynting vector directions for electromagnetic waves propagating in a negative index metamaterial.
Figure 3B:
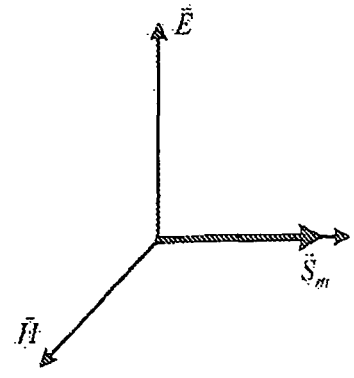

On the other hand, consider NIMs, where $\in<0$ and $\mu<0$. Maxwell's first order differential equations give the relations:

$$\vec{k}_m \times \vec{E} = -\omega|\mu|\vec{H}$$

$$\vec{k}_m \times \vec{H} = \omega|\in|\vec{E}$$

where $\vec{k}_m$ is a wavevector indicating the direction the phase the electromagnetic wave propagates in a NIM. As shown in FIG. 3A, and in contrast to the composite materials shown in FIG. 2A, for NIMs, the vectors $\vec{E}$, $\vec{H}$, and $\vec{k}_m$ form an orthogonal, left-handed system of vectors. In other words, comparing the directions of the wavefronts represented by the wavevectors $\vec{k}_c$ and $\vec{k}_m$ shown in FIGS. 2A and 3A, respectively, reveals that electromagnetic waves propagate backwards in NIMs for the same orientation of the vectors $\vec{E}$ and $\vec{H}$. Thus, NIMs are also referred to as "left-handed media" or "backward media." However, as shown in FIG. 3B, the Poynting vector $\vec{S}_m$ in a metamaterial is unaffected by the change of sign of $\in$ and $\mu$, and the vectors $\vec{E}$, $\vec{H}$, and $\vec{S}_m$ still form an orthogonal, right-handed system of vectors in a left-handed medium. Therefore, in NIMs, energy and wavefronts travel in opposite directions.

Now consider the refraction of an incident ray at the interface between ordinary and left-handed media. Based on the properties of electromagnetic waves travelling in NIMs described above, it follows that, unlike refraction observed in ordinary media, the angles-of-incidence and refraction have opposite signs. Snell's law in NIMs becomes:

$$\frac{\sin\theta_1}{\sin\theta_2} = \frac{-|k_2|}{|k_1|} \equiv \frac{n_2}{n_1} < 0,$$

where the subscripts 1 and 2 identify ordinary and left-handed media, respectively. Assuming $n_1 > 0$, from Snell's law it follows that $n_2 < 0$. That is, the sign of the square root in the definition of the refractive index is chosen to be negative:

$$n_2 = -\sqrt{\in \mu} < 0$$

Hence the term "negative index material" is used to refer to materials having both negatives $\in$ and $\mu$.

Figure 4:
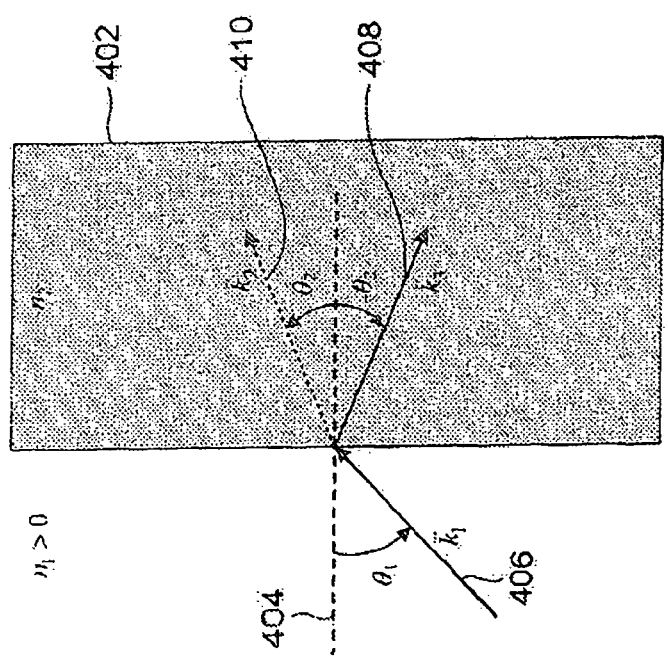
FIG. 4 shows refraction of rays of electromagnetic radiation in an ordinary right-handed medium and a negative index metamaterial.

FIG. 4 shows refraction of rays of electromagnetic radiation in an ordinary right-handed medium and a negative index metamaterial. Dashed line 404 represents a surface normal extending perpendicular to the surface of a medium 402. As shown in FIG. 4, angle $\theta_1$ and wavevector $\vec{k}_1$ 406 represent the angle-of-incidence and direction of a ray of electromagnetic radiation propagating through an ordinary medium with index of refraction $n_1 > 0$ and is incident on the medium 402. Angle $-\theta_2$ and wavevector $\vec{k}_3$ 408 represent the angle-of-refraction and direction of a refracted ray of electromagnetic radiation propagating within the medium 402 with refractive index $n_2 < 0$, while angle $\theta_2$ and wavevector $\vec{k}_2$ 410 represent the angle-of-refraction and direction of a refracted ray of electromagnetic radiation propagating within the medium 402 with refractive index $n_2 > 0$, where $|n_2| > n_1$. Thus, for the medium 402 with a refractive index of $n_2 < 0$, the incident ray 406 and the refracted ray 408 lie on the same side of the surface normal 404, and for the medium 402 with a refractive index of $n_2 > 0$, the incident ray 406 and the refracted ray 410 lie on opposite sides of the surface normal 404.

Figure 5:
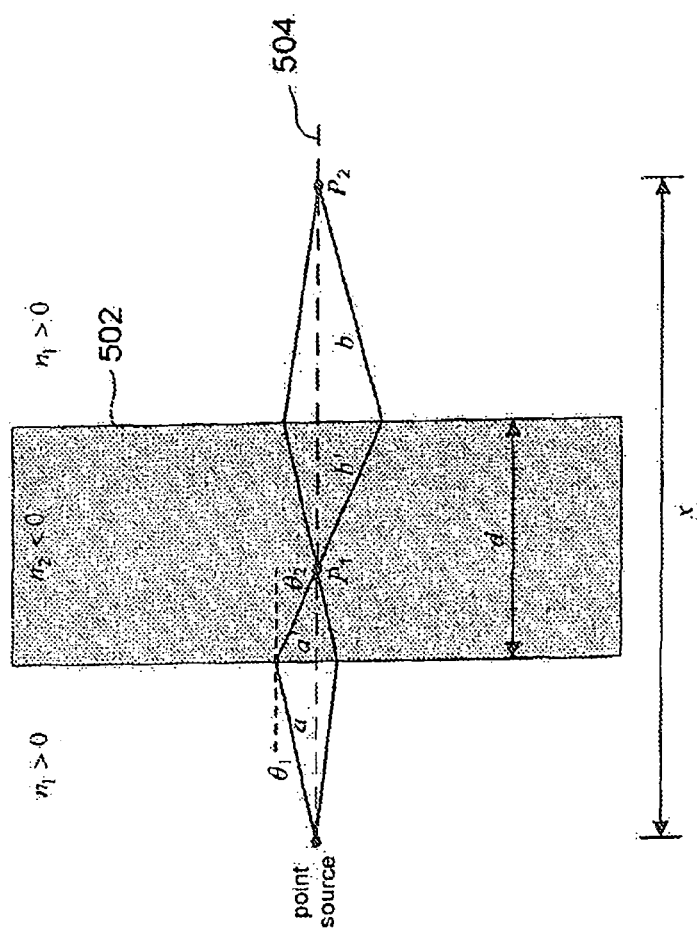
FIG. 5 shows focusing properties of a metamaterial slab for electromagnetic radiation emanating from a point source.

Tracing the paths of optical rays through conventional concave and convex lens made of left-handed media reveals that concave lenses become convergent and convex lens become divergent, thus reversing the behavior of lenses comprising ordinary media. FIG. 5 shows focusing properties of a slab 502 composed of a NIM for electromagnetic radiation emanating from a point source. For incident rays paraxial to an optical axis 504, Snell's law gives:

$$|n| = \frac{|n_2|}{n_1} = \frac{|\sin\theta_1|}{|\sin\theta_2|} \square \frac{|\tan\theta_1|}{|\tan\theta_2|} = \frac{a'}{a} = \frac{b'}{b}$$

where n is the refractive index $n_2$ of the slab 502 relative to refractive index of the surrounding medium $n_1$. As shown in FIG. 5, rays emanating from the point source are focused at two points $P_1$ and $P_2$. Point $P_1$ lies inside the slab 502 and point $P_2$ lies on the side of the slab 502 opposite the point source. The distance from the point source to the second focusing point $P_2$ is given by:

$$x = a + a' + b' + b = d + \frac{d}{|n|}$$

where d is the width of the slab. When n equals $-1$, the focusing effect is not restricted to paraxial rays, because in this case $|\theta_1|$ equals $|\theta_2|$ for any angle-of-incidence. In fact, when n equals $-1$, all rays emanating from the point source are focused at two points, the latter point $P_2$ being at a distance $2d$ from the point source. Thus, unlike slabs comprising ordinary composite materials, slabs composed of NIMs can be configured to focus electromagnetic radiation.

Negative Index Material Crossbars

Figure 6:
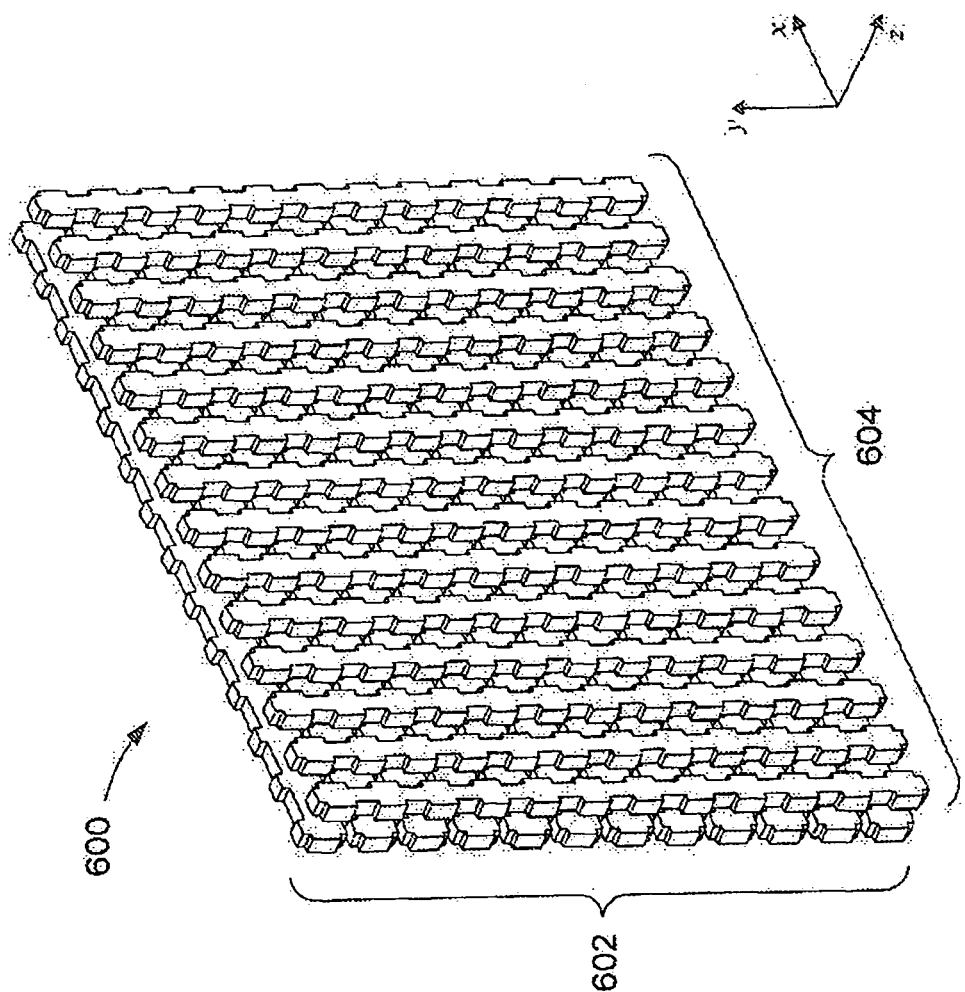
FIG. 6 shows an isometric view of a negative index material crossbar configured in accordance with embodiments of the present invention.

FIG. 6 shows an isometric view of a NIM crossbar 600 configured in accordance with embodiments of the present invention. The NIM crossbar 600 comprises a first layer of approximately parallel nanowires 602 that are overlain by a second layer of approximately parallel nanowires 604. The nanowires of the first layer 602 run substantially parallel to the x-axis and are approximately perpendicular, in orientation, to the nanowires of the second layer 604, which run substantially parallel to the y-axis, although the orientation angle between the nanowires of the layers 602 and 604 may vary. The two layers of nanowires form a lattice, or crossbar, with each nanowire of the second layer 604 overlying all of the nanowires of the first layer 602 and coming into close contact with each nanowire of the first layer 602 at nanowire intersections called "resonant elements" that represent the closest contact between two nanowires.

Figure 7:
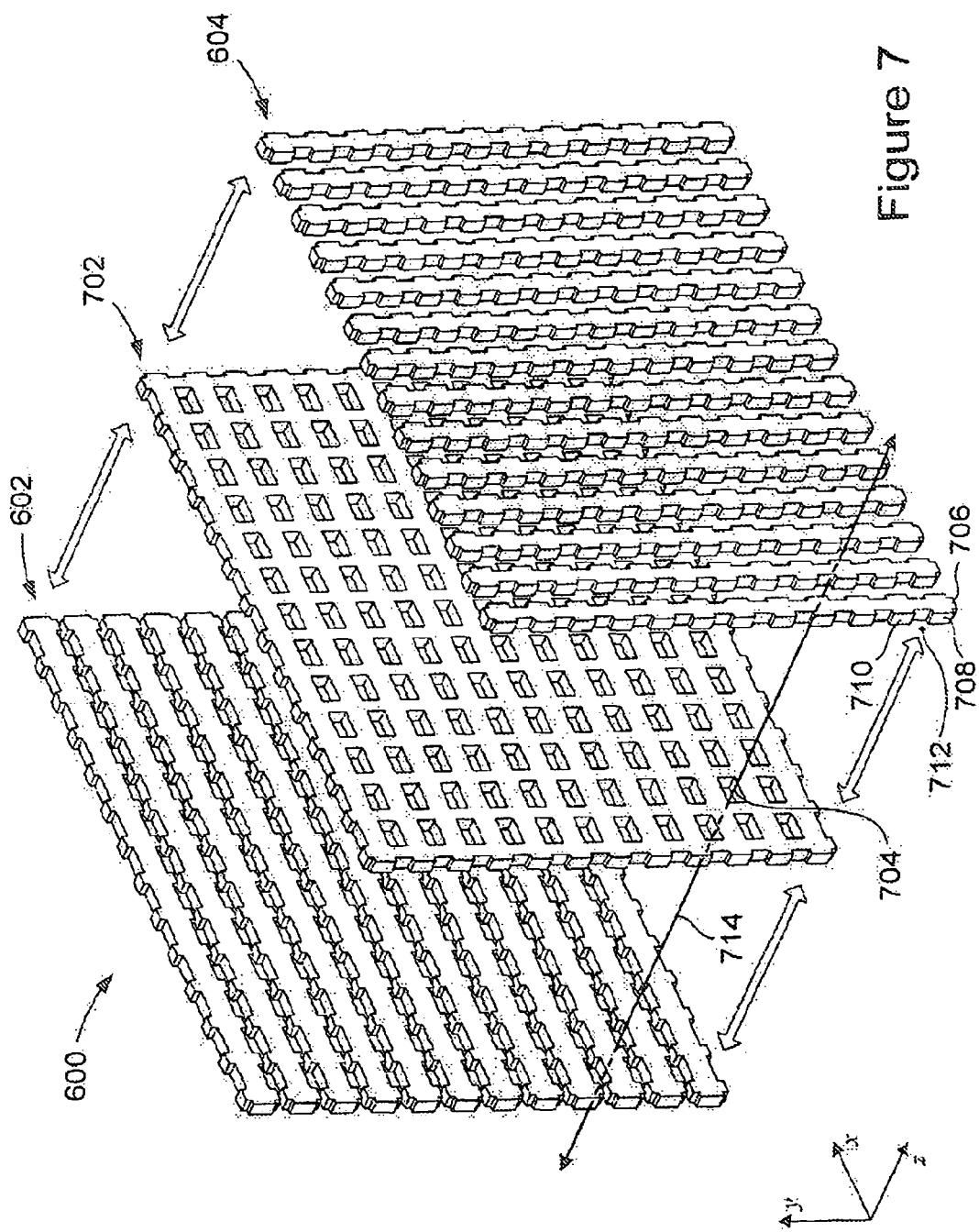
FIG. 7 shows an exploded isometric view of the negative index material crossbar configured in accordance with embodiments of the present invention.

FIG. 7 shows an exploded isometric view of the NIM crossbar 600 configured in accordance with embodiments of the present invention. FIG. 7 reveals an intermediate layer 702 sandwiched between the first layer of nanowires 602 and the second layer of nanowires 604. The intermediate layer 702 is a continuous layer including an array of regularly spaced holes, such as hole 704. In certain embodiments, as shown in FIG. 7, the holes can be rectangular, and in other embodiments, the holes can be square. The nanowires in the first layer 602 have relatively larger cross-sectional dimensions than the nanowires comprising the second layer 604. FIG. 7 also reveals that the nanowires in both the first and second layers 602 and 604 are configured with substantially regularly spaced protuberances called "fingers" that are separated by notches. For example, nanowire 706 includes fingers 708 and 710 separated by a notch 712. The fingers of nanowires of one layer are approximately parallel to the length of the nanowires in the other layer, and the fingers of adjacent nanowires within the same layer are also substantially aligned within the first and second layers 602 and 604, and the holes in the intermediate layer 702 are substantially aligned with the notches between fingers in the first and second layers 602 and 604. For example, line 714 passes through notches of adjacent nanowires in the first layer 602 passes through the hole 704 in the intermediate layer 702 and passes through notches in adjacent nanowires in the second layer 604.

Figure 8:
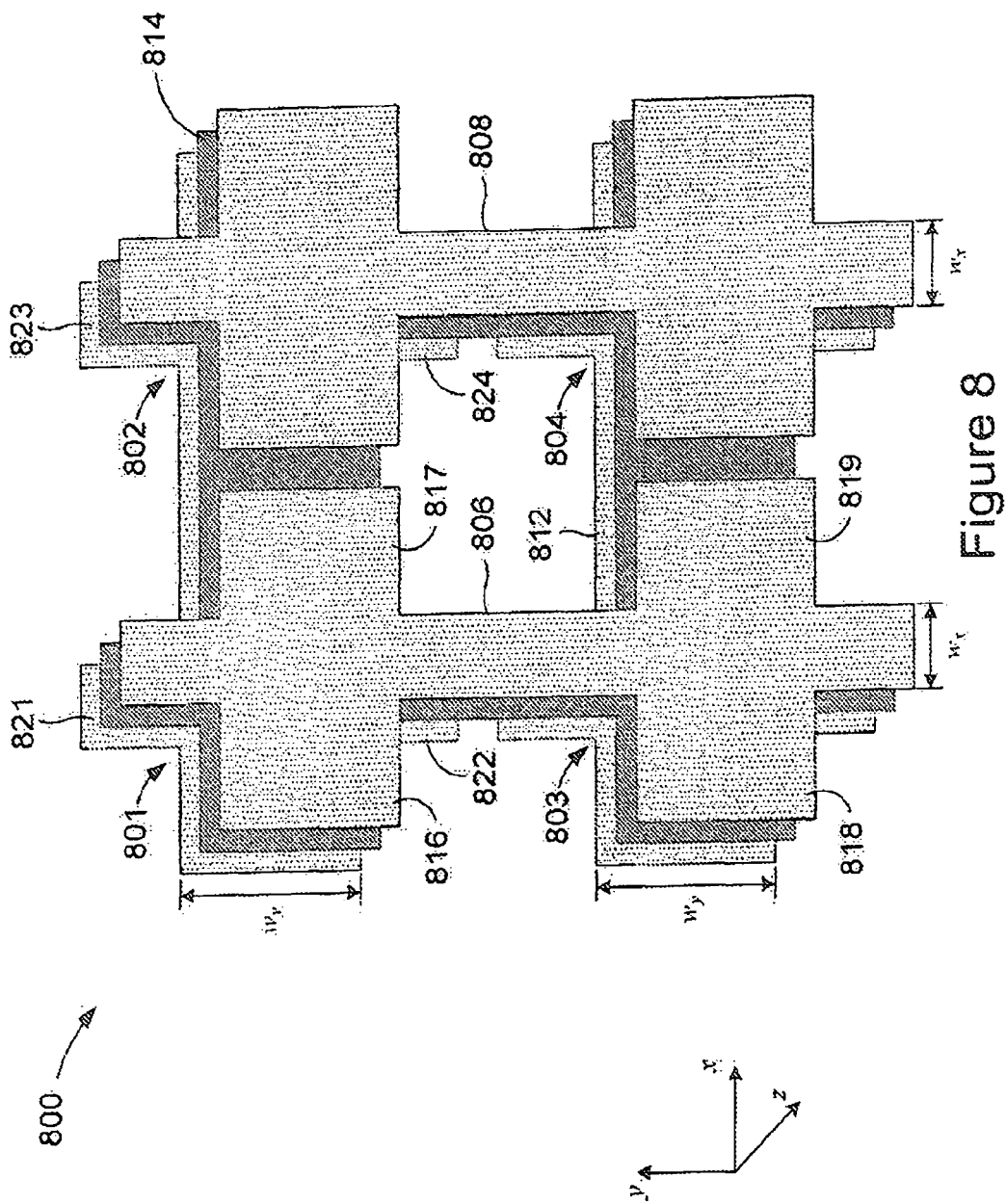
FIG. 8 shows an isometric view of an enlargement of a four adjacent resonant elements of the negative index material crossbar configured in accordance with embodiments of the present invention.

FIG. 8 shows an isometric view of an enlargement 800 of a four adjacent resonant elements 801-804 of the NIM crossbar 600 configured in accordance with embodiments of the present invention. The resonant elements 801-804 are formed by nanowires 806 and 808 extending in the y-direction overlaying portions of nanowires 810 and 812 extending in the x-direction. The nanowires 806 and 808 are separated from the nanowires 810 and 812 by a portion 814 of intermediate layer 702. The width $w_x$ of the nanowires 810 and 812 in the first layer 602 is larger than the width $w_y$ of the nanowires 806 and 808 in the second layer 604. The nanowires 806 and 808 include fingers protruding in the x-direction, such as fingers 816-819 of nanowire 806, and nanowires 810 and 812 include fingers protruding in the y-direction, such as fingers 821-824 of nanowire 810. The fingers of adjacent nanowires lying in the same layer are separated by gaps. As shown in FIG. 8, each of the resonant elements 801-804 includes two fingers of a nanowire in the first layer 602 and two fingers of a nanowire in the second layer 604. For example, resonant element 801 includes fingers 816 and 817 of nanowire 806 and fingers 821 and 822 of nanowire 810.

Figure 9:
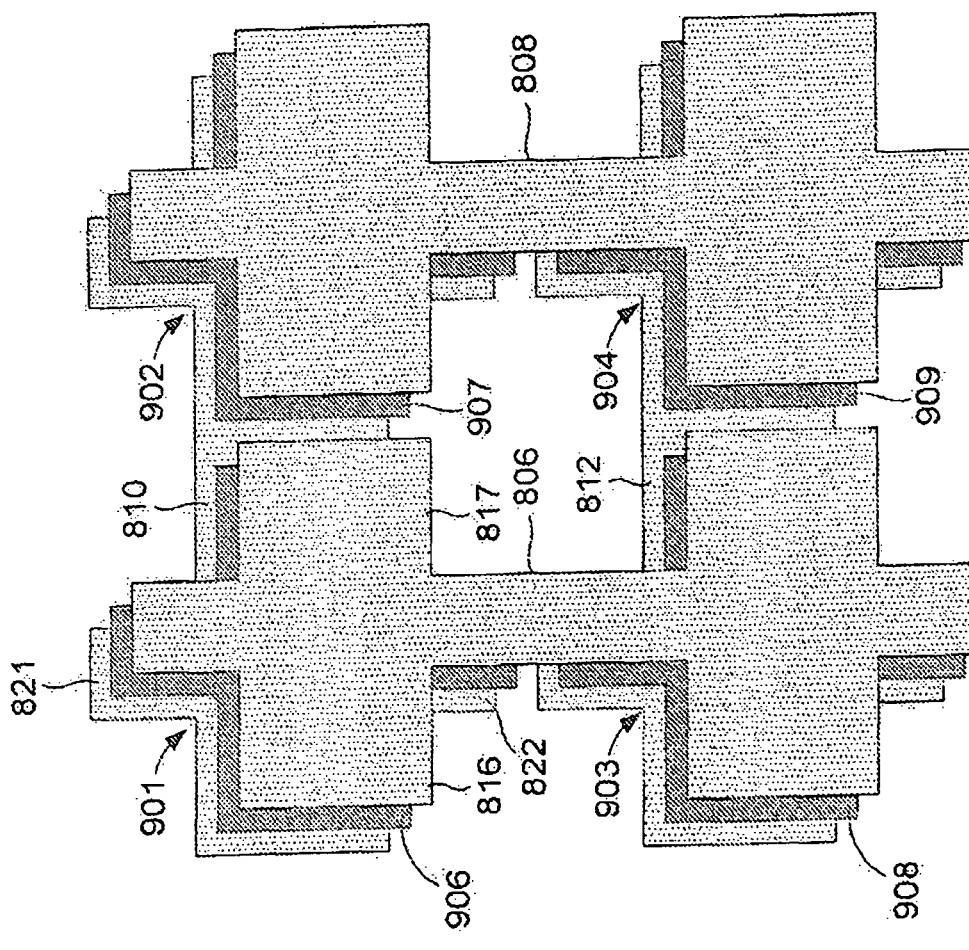
FIG. 9 shows an isometric view of an enlargement of four adjacent resonant elements of a negative index material crossbar configured in accordance with embodiments of the present invention.

In other embodiments, the intermediate layer 702 may be composed of discrete portions of a material lying within each resonant element. FIG. 9 shows an isometric view of an enlargement 900 of four adjacent resonant elements 901-904 of a NIM crossbar configured in accordance with embodiments of the present invention. The resonant elements 901-904 include intermediate plus-shaped layers 906-909, respectively, disposed within the region between the fingers of nanowires 806 and 808 overlaying nanowires 810 and 812. As shown in FIG. 9, adjacent plus-shaped layers 906-909 are separated by gaps, and each plus-shaped layer fills the space between the nanowire of one layer and the fingers of a nanowire in another layer. For example, plus-shaped layer 906 is configured to fill the space between fingers 821 and 822 and nanowire 806 and fill the space between fingers 816 and 817 and nanowire 810.

Although individual nanowires shown in FIG. 6-9 have rectangular cross sections, nanowires can also have square, circular, elliptical, or more complex cross sections dictated by design of supporting a magneto-plasmon resonance and related NIM behavior over a particular wavelength or frequency range of interest of the electromagnetic spectrum. The nanowires may be configured to have many different widths or diameters and aspect ratios or eccentricities ranging from approximately 1/5 to approximately 1/20 of the wavelength of incident electromagnetic radiation or ranging from approximately 20 nm to approximately 200 nm. Although the fingers shown in FIGS. 6-9 have clearly defined edges, in other embodiments, the fingers may have rounded edges. The term "resonant element" may refer to crossbars having one or more layers of sub-microscale wires, microscale wires, or wires with larger cross-sectional dimensions, in addition to nanowires. The nanowires can be comprised of silver ("Ag"), gold ("Au"), copper ("Cu"), aluminum ("Al"), platinum ("Pt"), or another suitable electronically conducting metal, or the nanowires can be composed of heavily doped semiconductors depending on the frequency of incident electromagnetic radiation.

The crossbar layers can be fabricated by mechanical nanoimprinting techniques. Alternatively, nanowires can be chemically synthesized and can be deposited as layers of approximately parallel nanowires in one or more processing steps, including Langmuir-Blodgett processes with subsequent patterning. Other alternative techniques for fabricating nanowires may also be employed. Thus, a two-layer nanowire crossbar comprising first and second layers of nanowires, as shown in FIGS. 6-9, can be manufactured by any of numerous relatively straightforward processes. Many different types of conductive and semi-conductive nanowires can be chemically synthesized from metallic and semiconductor substances, from combinations of these types of substances, and from other types of substances. A nanowire crossbar may be connected to microscale address-wire leads or other electronic leads, through a variety of different methods in order to electronically couple the nanowires to electronic devices.

The resonant elements can be configured with dimensions that are smaller than the wavelength $\lambda$, of electromagnetic radiation incident on the crossbar 600 enabling the crossbar 600 to be operated as a NIM over particular wavelength ranges of interest. In particular, the size and shape of the fingers can be selected to have an appropriate inductance, resistance, and capacitance response to a wavelength of interest. In addition, because each resonant element can be separately addressed by biasing the pair of nanowires crossing at the selected resonant element, the refractive index of the intermediate layer of each resonant element can be adjusted by applying appropriate electronic signals, such as voltages or currents, to the nanowires. The size and shape of the fingers and control over the refractive index of the intermediate layer of the resonant elements enables the crossbar 600 to be configured and operated as a NIM over particular wavelength ranges of interest and shift the transmission phase of electromagnetic radiation transmitted through the crossbar 600.

Figure 10:
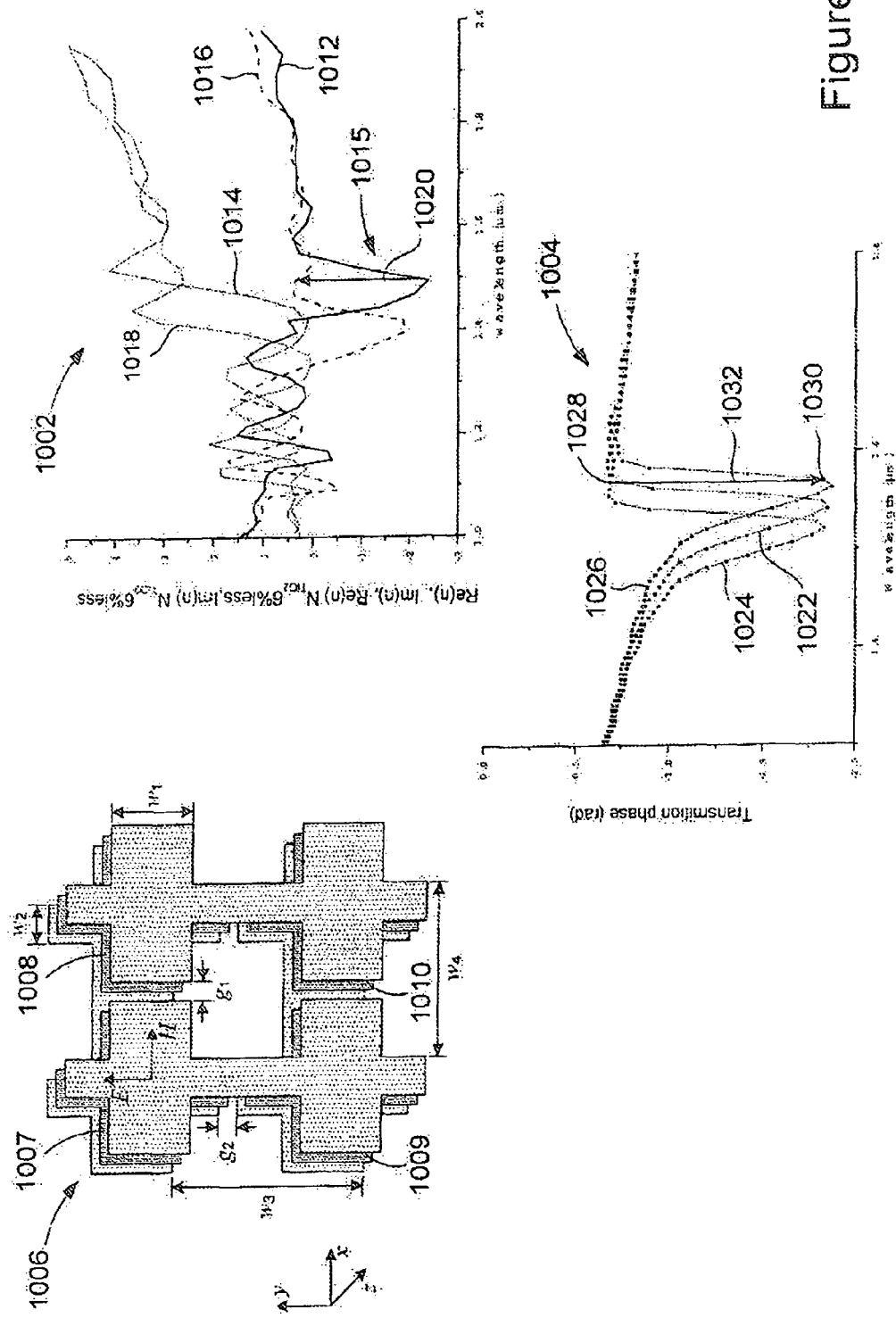
FIG. 10 shows a plot of the refractive index and phase changes for an exemplary negative index material crossbar configured and operated in accordance with embodiments of the present invention.

FIG. 10 shows a plot of the refractive index 1002 and phase changes 1004 for an exemplary NIM crossbar configured and operated in accordance with embodiments of the present invention. Plots 1002 and 1004 were obtained using the well-known finite-difference time-domain method ("FDTD") described in *Computational Electrodynamics: The Finite-Difference Time-Domain Method*, Third Edition, by Allen Taflove and Susan C. Hagness, Artech House Publishers (Jun. 30, 2005). FIG. 10 also includes a crossbar 1006 representing four adjacent resonant elements with parameters identifying the dimensions of the nanowires, fingers, and spacing between resonant elements used to obtain the results displayed in plots 1002 and 1004. The dimensions of the parameters are provided in Table I as follows:

TABLE I

| Parameter | Dimension |
|---|---|
| $w_1$ | 225 nm |
| $w_2$ | 90 nm |
| $w_3$ | 450 nm |
| $w_4$ | 450 nm |
| $g_1$ | 45 nm |
| $g_2$ | 45 nm |

The nanowires are composed of Ag, and the plus-shaped intermediate layers 1007-1010 are composed of $TiO_2$ with a thickness of 60 nm.

For electromagnetic radiation polarized in the y-direction and incident on the crossbar 1006 in the z-direction, curves 1012 and 1014 of plot 1002 represent the real and imaginary refractive index components, respectively, over a range of wavelengths with no electronic signal applied to resonant elements of the crossbar 1006. A portion 1015 of the real component 1012 indicates that the crossbar 1006 exhibits a negative refractive index for incident electromagnetic radiation with wavelengths ranging from approximately 1.42 μm to approximately 1.55 µm with the largest negative refractive index occurring for incident electromagnetic radiation with wavelengths of approximately 1.5 µm. Curves 1016 and 1018 of plot 1002 represent the real and imaginary refractive index components with a 6% change in the refractive index when appropriate electronic signals are applied to the nanowires of the crossbar 1006. Curve 1016 exhibits a real negative refractive index shift for incident electromagnetic radiation with wavelengths ranging from approximately 1.32 µm to approximately 1.46 µm with the largest negative refractive index occurring for incident electromagnetic radiation with wavelengths of approximately 1.4 µm. In other words, the crossbar 1006 can be operated to change the refractive index that incident electromagnetic radiation encounters over particular wavelength ranges. For example, incident electromagnetic radiation with a wavelength of interest, such as a wavelength of approximately 1.5 µm, encounters the strongest real negative refractive index component when no electronic signal is applied to the crossbar 1006. However, when appropriate electronic signals are applied to the nanowires, the refractive index encountered by the wavelength of interest is shifted to a positive relatively smaller in magnitude refractive index, as indicated by directional arrow 1020.

A change in the refractive index encountered by the wavelength of interest shifts the transmission phase of the wavelength of interest. Curves 1022-1024 of plot 1004 represent the transmission phase of electromagnetic radiation over a range of wavelengths passing through the crossbar 1006 for three different refractive indices. Curve 1022 represents the transmission phase acquired by electromagnetic radiation over a range of wavelengths passing through the crossbar 1006 when no electronic signal is applied to the crossbar 1006. Curve 1024 represents the transmission phase acquired by electromagnetic radiation over a range of wavelengths passing through the crossbar 1006 when electronic signals applied to the nanowires of the crossbar 1006 increase the refractive index of the intermediate layers 1007-1010 by 3%. Curve 1026 represents the transmission phase acquired by electromagnetic radiation over a range of wavelengths passing through the crossbar 1006 when electronic signals applied to the nanowires of the crossbar 1006 decrease the refractive index of the intermediate layers 1007-1010 by 3%. The crossbar 1006 can be operated to shift the phase acquired by a wavelength of interest. The transmission phase is the phase acquired by electromagnetic radiation transmitted through the crossbar 1006. For example, when no electronic signal is applied to the crossbar 1006, point 1028 indicates that electromagnetic radiation with the wavelength interest, approximately 1.58 µm, transmitted through the crossbar 1006 acquires a transmission phase of approximately −0.7 radians. On the other hand, when electronic signals corresponding to the curve 1026 are applied to the crossbar 1006, the wavelength of interest acquires a transmission phase of approximately −1.78 radians, which is a transmission phase shift of approximately −1.2 radians from the point 1028 to the point 1030, as indicated by directional arrow 1032.

Resonant Elements

The refractive index of the materials selected for the intermediate layer of the resonant elements can vary according to the particular molecular configuration or electronic states of the material. The materials selected for the resonant elements exhibit an appreciable refractive index change in response to externally applied electric fields, which can be used to control the resonant behavior of the phase shift, as described above with reference to FIG. 10. In certain embodiments, the material may transition reversibly from one state to another and back, so that the resonant elements may be reconfigured, or programmed, by application of differential current levels or voltages, called electronic signals, to selected resonant elements. The molecules comprising the intermediate layers of the resonant elements may have various different states in which the molecules exhibit resistive, semiconductor-like, or conductive electrical properties. The states and relative energies of the states of the intermediate layer materials may be controlled by applying differential current levels or voltages to the overlapping nanowires forming the resonant element. For example, in certain embodiments, certain states of the intermediate layer materials can be set by applying electronic signals to nanowires of a resonant element. In certain embodiments, the applied electronic signals can change the oxidation or redox state of the intermediate layer material which induces a change in the refractive index of the resonant element. Additional circuit elements such as diodes, transistors, memristors, capacitors, and resistors for optimal performance can be formed at resonant elements or a part of the nanowire crossbar. A nanowire crossbar can also be integrated with CMOS circuits.

Figure 11:
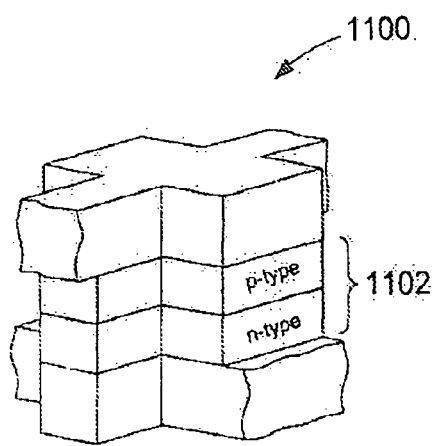
FIG. 11 shows an isometric view a resonant element configured with a p-n junction intermediate layer in accordance with embodiments of the present invention.

In certain embodiments, the refractive index of the resonant elements can be configured and operated as p-n junctions in order to change the refractive index of the resonant elements by carrier injection. FIG. 11 shows an isometric view a resonant element 1100 configured with a p-n junction intermediate layer 1102 in accordance with embodiments of the present invention. The p-n junction 1102 can be composed of a wide variety of semiconductor materials including various combinations of elemental and compound semiconductors. Indirect elemental semiconductors include silicon (Si) and germanium (Ge), and compound semiconductors include III-V materials, where Roman numerals III and V represent elements in the Ma and Va columns of the Periodic Table of the Elements. Compound semiconductors can be composed of column Ma elements, such as aluminum (Al), gallium (Ga), and indium (In), in combination with column Va elements, such as nitrogen (N), phosphorus (P), arsenic (As), and antimony (Sb). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

As shown in FIG. 11, p-n junction 1102 includes a p-type layer and an n-type layer, where the p-type layer is doped with electron accepting impurities and the n-type layer is doped with electron donating impurities. The impurities also called dopants can be atoms. The dopants can be p-type impurities, which are atoms that introduce vacant electronic energy levels called "holes" to the electronic band gaps of the p-n junction 1102. These impurities are also called "electron acceptors." The dopants can be n-type impurities, which are atoms that introduce filled electronic energy levels to the electronic band gap of the p-n junction 1102. These impurities are called "electron donors." For example, boron (B), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities. Moderate doping of the p-type and n-type layers can have impurity concentrations in excess of about $10^{15}$ impurities/cm$^3$ while heavier doping can have impurity concentrations in excess of about $10^{19}$ impurities/cm$^3$.

The refractive index of the p-n junction 1102 can be adjusted by varying the magnitude and type of bias applied to p-n junction 1102. For example, a forward bias injects electrons into the n-type layer and vacant electronic states called "holes" are injected into the p-type layer. Under a reverse bias, electrons are injected into the p-type layer and holes are injecting into the n-type layer. However, once the bias is removed, the electrons and holes are swept out of the layers and the p-n junction 1102 returns to an unbiased electronic state. The refractive index of the p-n junction 1102 is different under the forward, reverse, and no bias.

Figure 12:
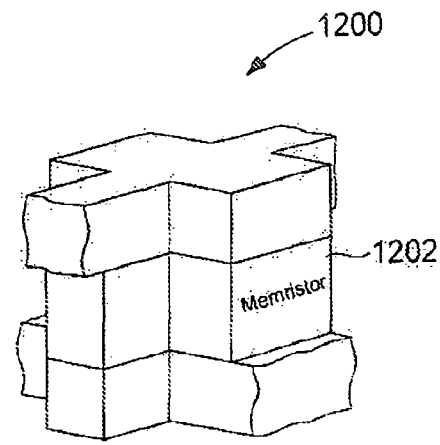
FIG. 12 shows an isometric view a resonant element configured with an intermediate memristors layer in accordance with embodiments of the present invention.
Figure 13:
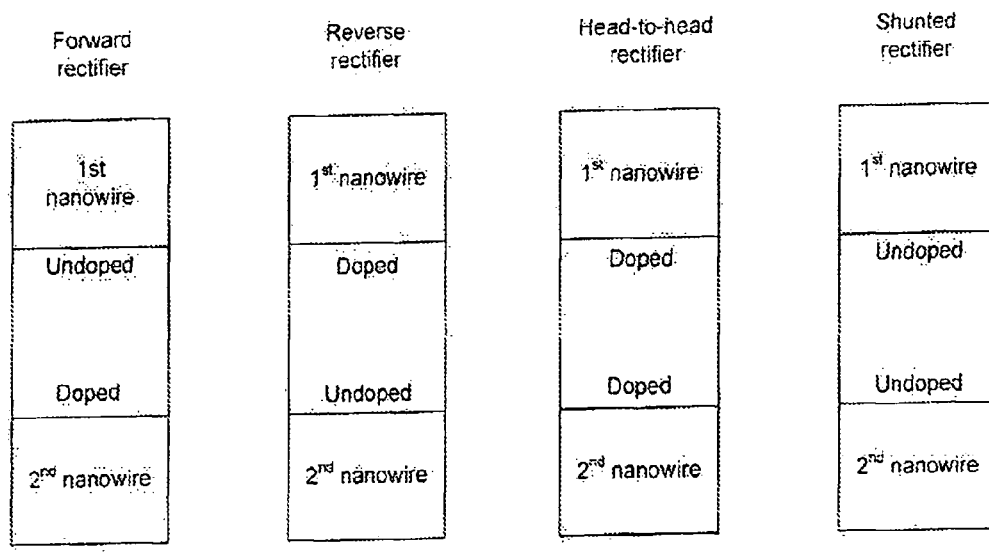
FIG. 13 shows four cross-sectional views of dopant distributions in memristor elements in accordance with embodiments of the present invention.

In other embodiments, the resonant elements can be configured as memristors that can change and retain their resistance state even after the bias has been removed. Each resistance state corresponds to a different refractive index. FIG. 12 shows an isometric view a resonant element 1200 configured with an intermediate memristors layer 1202 in accordance with embodiments of the present invention. The memristor layer 1202 includes a primary active region, or layer, and a secondary active region, or layer. The primary active region comprises a thin film of a material that is electronically semiconducting or nominally electronically insulating and can also be a weakly ionic conductor. The primary active material is capable of tranporting and hosting ions that act as dopants to control the flow of electrons through the resonantor element 1200. The basic mode of operation is to apply a voltage bias of an appropriate magnitude and polarity across the memristor layers at the junctions. The electrical field, also called a "drift field," enables the motion of the dopants in the primary material to drift into or out of the primary material via ionic transport. The ionic species are specifically chosen from those that act as electrical dopants for the primary material, and thereby change the rectifying state of the primary active material. The memristor layer 1202 can be placed in one of the four different types of rectifying states: a forward rectifier, a reverse rectifier, a head-to-head rectifier, and a shunted rectifier, as shown in FIG. 13. Each of the rectifying states corresponds to a different refractive index.

In addition, the primary active material and the dopants are chosen such that the drift of the dopants into or out of the primary active material is possible but not too facile in order to ensure that the memristor layer 1202 remains in a particular rectifying state for a reasonable period of time, perhaps for many years at room temperature. This ensures that the memristor layer 1202 is nonvolatile. In other words, the memristor layer 1202 holds its rectifying state (i.e., keeps memory of its resistive state) after the drift field has been removed. Applying a drift field with a large enough magnitude causes both electron current and dopant to drift, whereas applying biases with lower relative voltage magnitudes than the drift field causes neglible dopant drift enabling the element to hold its rectifying state.

On the other hand, the secondary active region comprises a thin film that is a source of dopants for the primary active material. These dopants may be impurity atoms such as hydrogen or some other cation, such as alkali or transition metals, that act as electron donors for the primary active material. Alternatively, the dopants can be anion vacancies, which in the primary active material are charged and therefore are also electron donors for the lattice. It is also possible to drive the anions into the primary active material, which become electon acceptors or hole donors.

The primary active material can be nanocrystalline, nanoporous, or amorphous. The mobility of the dopants in such nanostructured materials is much higher than in bulk crystalline material, since diffusion can occur through grain boundaries, pores or through local structural imperfections in an amorphous material. Also, because the primary active material film is thin, the amount of time needed for dopants to diffuse into or out of region of the film to substantially change the film's conductivety is relatively rapid. For example, the time needed for a diffusive process varies as the square of the distance convered, so the time to diffuse one nanometer is one-millionth the time to diffuse one micrometer.

The primary active and secondary active regions of the memristor layer 1202 are contacted on either side by nanowires or one of the nanowires can be composed of a semiconductor material and the other a metal. When the memristor layer 1202 is composed of semiconductor material, the contract between a metal electrode and the memristor layer 1202 depletes the memristor layer 1202 of free charge carriers. Thus, the memristor layer 1202 has a net charge that depends on the identity of the dopant which is positive in the case of electron donors and negative in the case of electron acceptors.

Switching from one rectifying state to another can be accomplished by applying an electric field of an appropriate magnitude and polarity across the memristor layer 1202. The electric field forces the dopants to drift into or out of the electrode/active region interface regions thus changing the rectifying state of the memristor layer 1202. For example, as shown in FIG. 13, an appropriate electric field can be used to force dopants located near the interfaces of the shunted rectifier to move to one of the interfaces thus changing the shunted rectifier into either the forward rectifier or the reverse rectifier.

The ability of the charged species to diffuse into and out of the primary active material is substantially improved if one of the interfaces connecting the memristor layer 1202 to a metal or semiconductor electrode is non-covalently bonded. Such an interface may be caused by a void in the material or it may be the result of an interface that contains a material that does not form covalent bonds with the electrode, the primary active material, or both. This non-covalently bonded interface lowers the activation energy of the atomic rearrangements that are needed for drift of the dopants in the primary active material. This interface is essentially an extremely thin insulator, and adds very little to the total series resistance of the element.

The primary and secondary active materials of the memristor layer 1202 can be oxides, sulfides, selenides, nitrides, phosphides, arsenides, chlorides, hydrides, and bromides of the transition and rare earth metals, with or without the alkaline earth metals being present. In addition, there are various alloys of these compounds with each other, which can have a wide range of compositions if they are mutually soluble in each other. In addition, the memristor layer 1202 can be composed of mixed compounds, in which there are two or more metal atoms combined with some number of electronegative elements. The dopants can be anion vacancies or different valence elements doped in the memristor layer 1202. One combination of materials is a primary active material that is undoped and stoichiometric, and thus a good insulator, combined with a secondary source/sink of the same or related parent material that either contains a large concentration of anion vacancies or other dopants that can drift into the primary material under the application of an appropriate bias.

The memristor layer 1202 can be composed of oxides that contain at least one oxygen atom (O) and at least one other element. In particular, the memristor layer 1202 can be composed of silica ($SiO_2$), titania ($TiO_2$), nickel-oxide (NiO), zirconia ($ZrO_2$), and hafnia ($HfO_2$) with or without 3d impurities (e.g., Cr, Mn), or sp-impurities (e.g., Li, Be, Ca). These materials are compatible with silicon (Si) integrated circuit technology because they do not create doping in the Si. Other embodiments for the memristor layer 1202 include alloys of these oxides in pairs or with all three of the elements Ti, Zr, and Hf present. For example, the memristor layer 1202 can be composed of $Ti_xZr_yHf_zO_2$, where $x+y+z=1$. Related compounds include titanates, zirconates, and hafnates. For example, titanates includes $ATiO_3$, where A represents one of the divalent elements strontium (Sr), barium (Ba) calcium (Ca), magnesium (Mg), zinc (Zn), and cadmium (Cd). In general, the memristor layer 1202 can be composed of $ABO_3$, where A represents a divalent element (e.g., $Sr^{++}$, $Ba^{++}$) and B represents $Ti^{4+}$, $Zr^{4+}$, and $Hf^+$. The memristor layer 1202 can also be composed of alloys of these various compounds, such as $Ca_aSr_bBa_cTi_xZr_yHf_zO_3$, where $a+b+c=1$ and $x+y+z=1$. There are also a wide variety of other oxides of the transition and rare earth metals with different valences that may be used, both individually and as more complex compounds. In each case, the mobile dopant can be an oxygen vacancy or an aliovalent element doped into the memristor layer 1202. The oxygen vacancies effectively act as dopants with one shallow and one deep energy level. Because even a relatively minor nonstoichiometry of about 0.1% oxygen vacancies in $TiO_2$, is approximately equivalent to $10^{20}$ dopants/cm³, modulating oxygen vacancy profiles have strong effect on electron transport.

In other embodiments, the memristor layer 1202 can be a sulfide or a selenide of the transition metals with some ionic bonding character, essentially the sulfide and selenide analogues of the oxides described above.

In other embodiments, the memristor layer 1202 can be a semiconducting nitride or a semiconducting halide. For example, semiconducting nitrides include MN, GaN, ScN, YN, LaN, rare earth nitrides, and alloys of these compounds and more complex mixed metal nitrides, and semiconducting halides include CuCl, CuBr, and AgCl. The memristor layer 1202 can be a phosphide or an arsenide of various transition and rare earth metals. In all of these compounds, the mobile dopant can be an anion vacancy or an aliovalent element.

A variety of dopants can be used and are selected from a group consisting of hydrogen, alkali, and alkaline earth cations, transition metal cations, rare earth cations, oxygen anions or vacancies, nitrogen anions or vacancies, pnictide anions or vacancies, or halide anions or vacancies. Other suitable materials include metal hydrides, such as $Mg_2NiH_4$, $Mg_2MnH_7$, $Mg_6CO_2H_{11}$, $Mg_2CoH_5$, $Mg_2CoH_5$, and $Mg_2FeH_6$, and copper oxides, such as $Cu_2O$ and CuO, exhibit large changes in refractive indices.

Dynamically Reconfigurable Color Holograms

Figure 14:
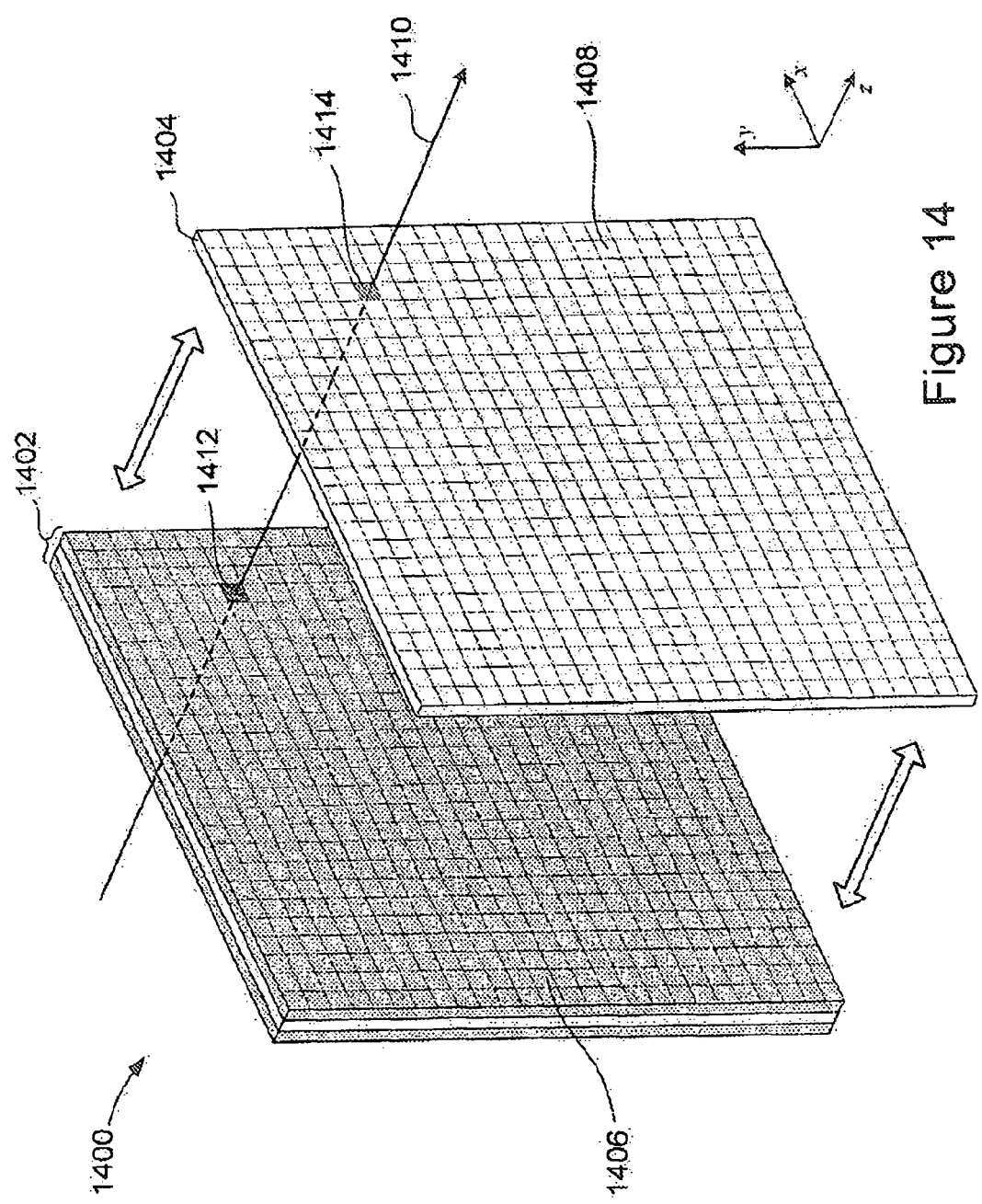
FIG. 14 shows an exploded isometric view of an electronically addressable and dynamically reconfigurable hologram configured in accordance with embodiments of the present invention.

FIG. 14 shows an exploded isometric view of an electronically addressable and dynamically reconfigurable hologram 1400 configured in accordance with embodiments of the present invention. The hologram 1400 includes a phase-control layer 1402 and an intensity-control layer 1404. As shown in the example of FIG. 14, the surface 1406 of phase-control layer 1402 and the surface 1408 of intensity-control layer 1404 include grid lines that outline two different two-dimensional arrays of squares. Each square in of phase-control layer 1402 represents a "phase-modulation element" that is substantially aligned with an "intensity-control element" of intensity-control layer 1204. For example, as shown in FIG. 14, directional arrow 1410 passes through a highlighted first phase-modulation element 1412 located in phase-control layer 1402 and passes through an associated second highlighted intensity-control element 1414 located in intensity-control layer 1404.

The phase-control layer 1402 is a resonant plasmonic metamaterial that can be operated to exhibit negative refraction for particular wavelengths of light. The resonant behavior translates into phase changes of refracted light. The effective refractive index of each phase-modulation element in phase-control layer 1402 can be independently and electronically controlled, and the transparency of each intensity-control element in intensity-control layer 1404 can also be independently and electronically controlled. In other words, the phase-modulation elements and the intensity-control elements are said to be "electronically addressable." For a ray of light passing through any pair of aligned phase-modulation and intensity-control elements, a transmission phase can be applied to the ray by the phase-modulation element followed by a reduction in the intensity produced by the corresponding intensity-control element. For example, suppose directional arrow 1410 represents a ray of light originating from a light source (not shown) located behind phase-control layer 1402. As the ray passes through the phase-modulation element 1412, a first electronic signal applied to the element 1412 induces a change in the refractive index of the element 1412. As a result, the ray 1410 acquires a transmission phase as it emerges from the pixel 1412, and it may also experience an intensity decrease due to insertion loss. As the ray subsequently passes through intensity-control element 1414, a second electronic signal applied to the element 1414 changes the transparency of the element 1414 and, thus, adjusts the intensity of the ray as it emerges from the intensity-control layer 1404. In other words, the phase-control layer 1402 and the intensity-control layer 1404 can be operated in conjunction to reproduce both wavefronts and intensity variations in light transmitted through individual elements of the phase-control layer 1402 and the intensity-control layer 1404. As a result, three-dimensional images can be produced by this collective optical effect of controlling the wavefront and the intensity of light emerging from the hologram 1400. Because the effective refractive index and the intensity of each element can be separately and electronically controlled, three-dimensional motion pictures can be produced. A more detailed description of the operation of the hologram 1400 is described below.

Embodiments of the present invention are not limited to a one-to-one correspondence between phase-modulation elements and intensity-control elements. In other embodiments, the phase-modulation elements and intensity-control elements can be arranged and configured so that light is transmitted through one or more phase-modulation elements and subsequently transmitted through one or more intensity-control elements.

Figure 15:
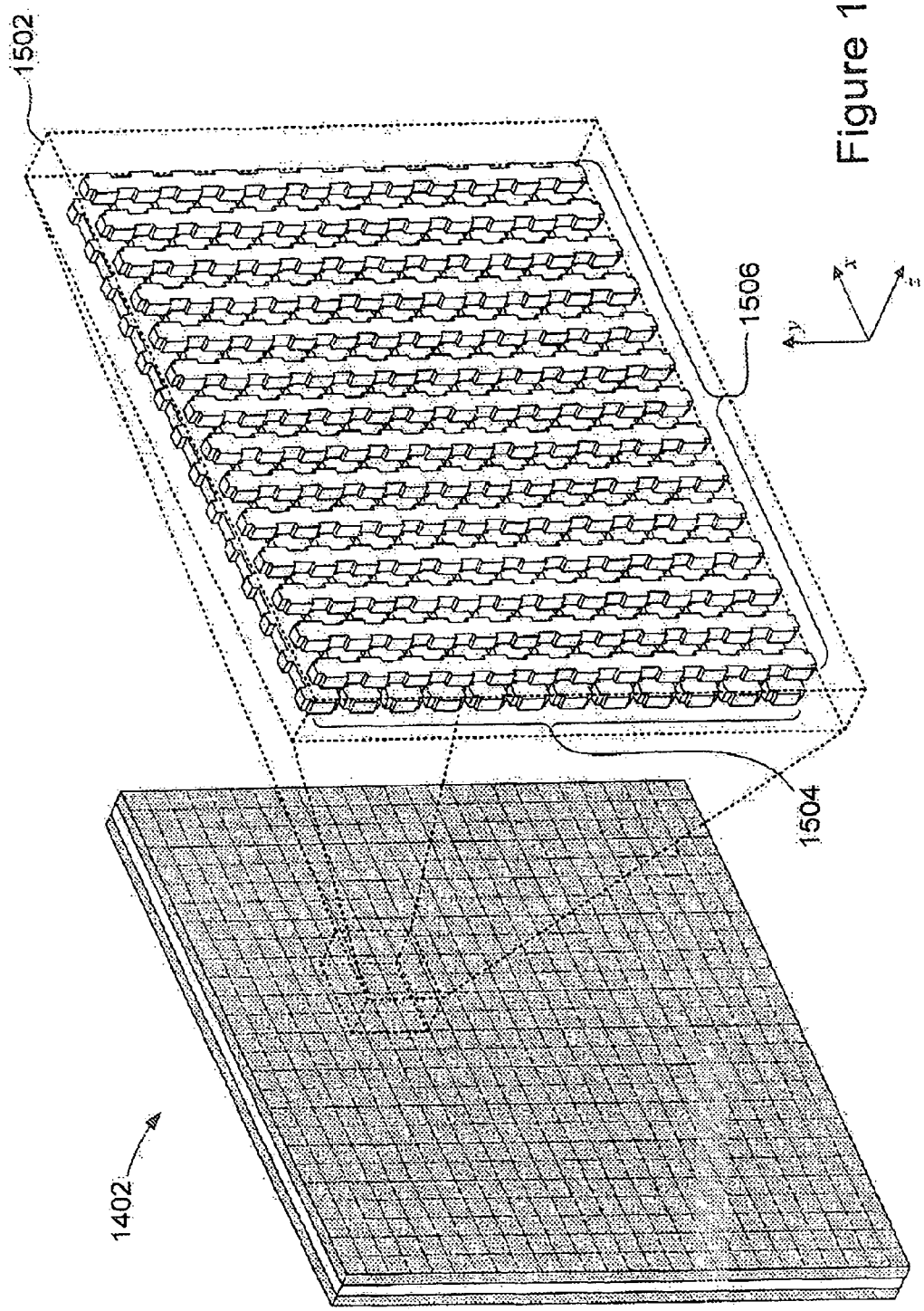
FIG. 15 shows an isometric view of an electronically reconfigurable phase-control layer configured in accordance with embodiments of the present invention.

FIG. 15 shows an isometric view of the phase-control layer 1402 configured in accordance with embodiments of the present invention. An enlarged region 1502 reveals that the phase-control layer 1402 is implemented as a NIM crossbar comprising an intermediate layer sandwiched between a first layer of substantially parallel nanowires 1504 and a second layer of approximately parallel nanowires 1506, where the nanowires in the first layer 1504 are approximately perpendicular to the nanowires in the second layer 1506.

Figure 16:
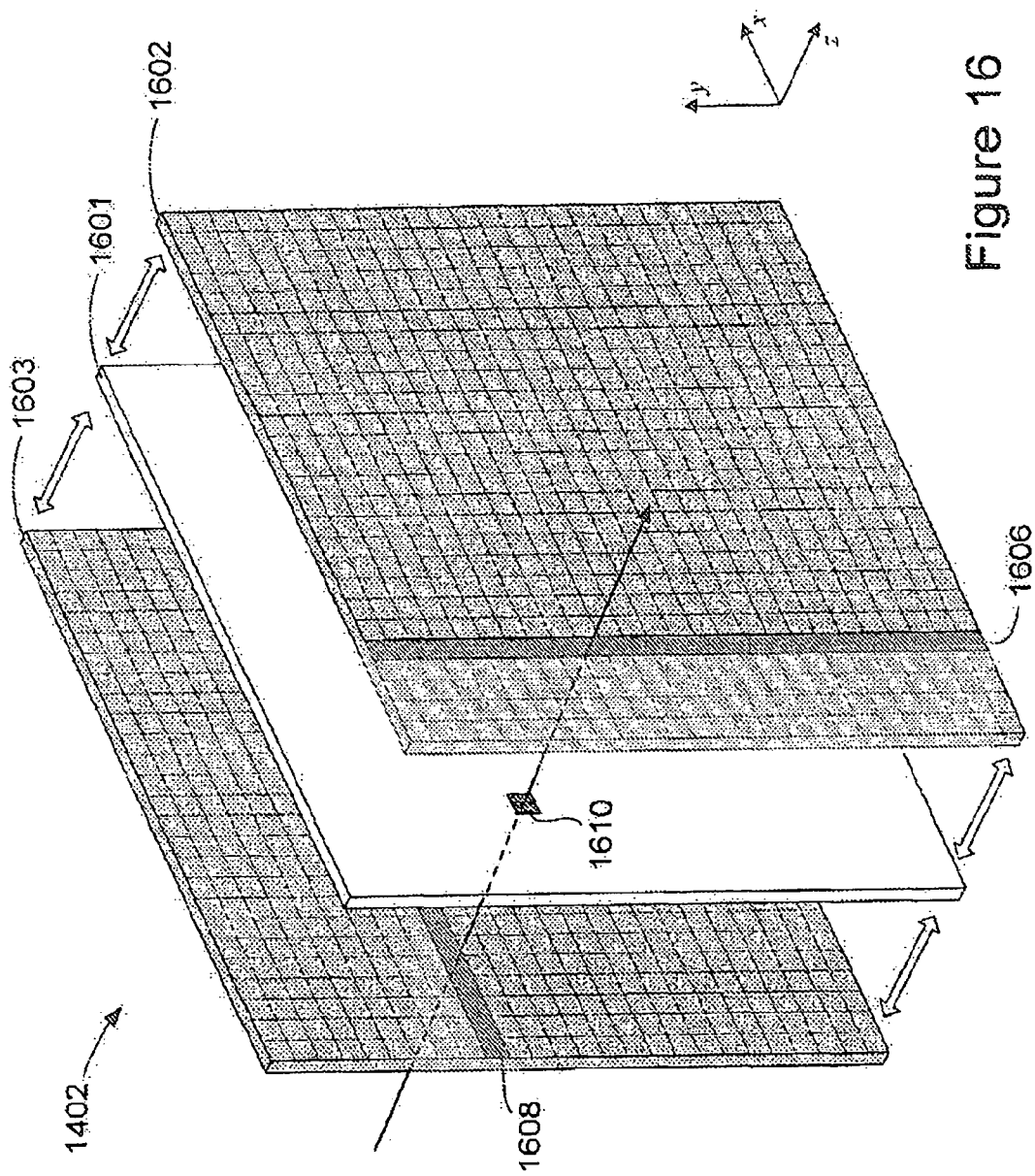
FIG. 16 shows an exploded isometric view of the phase-control layer shown in FIG. 15 in accordance with embodiments of the present invention.

FIG. 16 shows an exploded isometric view of the phase-control layer 1402 comprising an intermediate layer 1601 sandwiched between two outer nanowire layers 1602 and 1603, as described above with reference to FIG. 7. The intermediate layer 1601 serves as a phase-modulation layer as described below and, hereinafter, is also referred to as the phase-modulation layer 1601. Each phase-modulation element is electronically addressed by applying appropriate electronic signals to substantially orthogonal overlapping nanowires defining the phase-modulation element. For example, as shown in FIG. 16, applying an appropriate electronic signal to nanowires 1606 of nanowire layer 1602 and simultaneously applying an appropriate electronic signal to nanowires 1608 of nanowire layer 1603 produces a voltage across, or current passing through, a region 1610 of layer 1601 causing the refractive index of the region 1610 to change. The degree to which the refractive index is changed can be varied depending on the magnitude of the electronic signal applied to the region 1610.

The intermediation layer 1601 is composed of materials and configured so that each phase-modulation element transmits only one of three wavelengths, each wavelength associated with one of three primary colors of the color spectrum. For example, in certain embodiments, a first wavelength $\lambda_r$ corresponds to a wavelength in the red portion of the color spectrum, a second wavelength $\lambda_g$ corresponds to a wavelength in the green portion of the color spectrum, and a third wavelength $\lambda_b$ corresponds to a wavelength in the blue portion of the color spectrum. The three different types of phase-modulation elements are referred as red, green, and blue elements. A red element transmits only the wavelength $\lambda_r$, a green element transmits only the wavelength $\lambda_g$, and the green element transmits only the wavelength $\lambda_b$.

Figure 17:
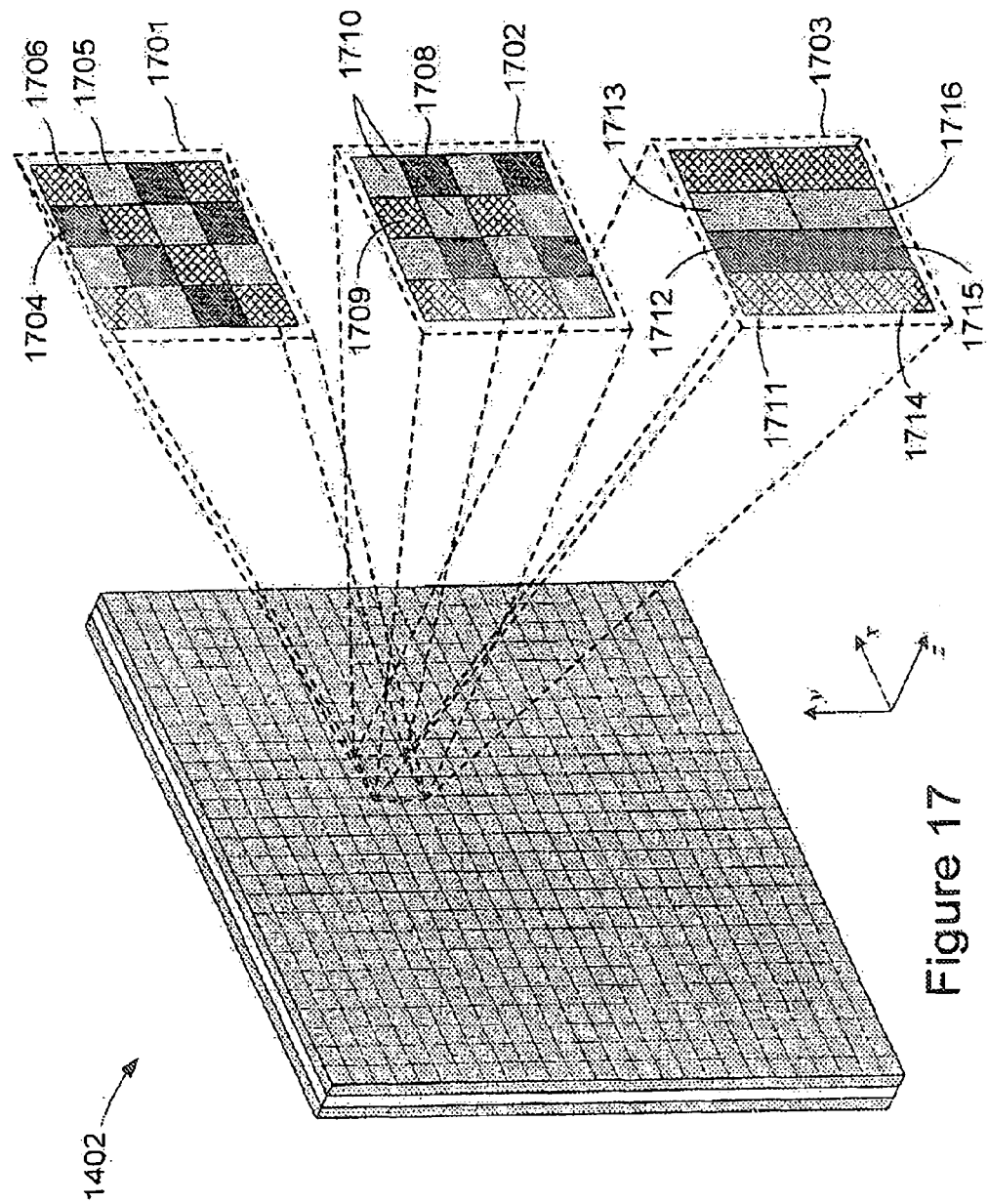
FIG. 17 shows an isometric view of the phase-control layer shown in FIG. 15 and three different enlargements of the same region, each enlargement representing a different pattern of phase-modulation elements in accordance with embodiments of the present invention.

A color pixel can be formed by three proximate red, green, and blue phase-modulation elements. FIG. 17 shows an isometric view of the phase-control layer 1402 and three different enlargements of the same region. Each enlargement displays one of three different patterns 1701-1703 for arranging red, green, and blue elements to form pixels in accordance with embodiment of the present invention. In each pattern, heavy shaded phase-modulation elements, such as element 1704, represent red elements; lightly shaded phase-modulation elements, such as element 1705, represent green elements; and cross-hatched phase-modulation elements, such as element 1706, represent blue elements. Pattern 1701 represents an embodiment where the red, green, and blue elements run along a diagonal of the phase-control layer 1402. Pattern 1702 represents an embodiment where odd rows comprise alternating green and blue elements and even rows comprise alternating red and green elements. A color pixel for the pattern 1701 can be composed of red, green, and blue elements 1704-1706; and a color pixel for the pattern 1702 can be composed of red and blue elements 1708 and 1709 and two green elements 1710. The pattern 1703 comprises elongated elements arranged in columns of the same color extending in the y-direction. For example, blue, red, and green elongated elements 1711-1713 comprise one pixel; and blue, red, and green elongate elements 1714-1716 comprise adjacent pixel. The blue elements 1711 and 1714 lie within a column of blue elements, the red elements 1712 and 1715 lie within a column of red elements, and the green elements 1713 and 1716 lie within a column of green elements. The red, green, and blue columns of elements extend in the y-direction along the entire length of the phase-control layer 1402. The pattern of elements 1701-1703 represent only three of many possible ways in which primary color elements can be arranged to form pixels. In other embodiments, other suitable patterns of primary color elements can be used.

FIG. 18 shows an isometric view of an enlarged region of the phase-control layer 1402 shown in FIG. 17 in accordance with embodiments of the present invention. Four phase-modulation elements 1801-1804 are identified in FIG. 18 by dashed-line enclosures. The phase-modulation elements 1801-1804 are each composed of a square array of 9 resonant elements and each phase-modulation element transmits one of the three primary color wavelengths $\lambda_r$, $\lambda_g$, and $\lambda_b$. As shown in FIG. 18, the phase-modulation elements 1801 and 1803 only transmit the wavelength $\lambda_g$, the phase-modulation element 1802 only transmits the wavelength $\lambda_r$, and the phase-modulation element 1804 only transmits the wavelength $\lambda_b$. A change in the effective refractive index of a phase-modulation element is the result of changes in the effective refractive indices of the resonant elements comprising the phase-modulation element. As described above in the subsections Negative Index Material Crossbars and Resonant Elements, an effective refractive index change of a resonant element can be the result of changes in an oxidation or redox state, resistivity, variation in ion concentration, injection of charge carriers under a forward or reverse bias, or any other source of refractive index change. A change in the effective refractive index of a resonant element depends on the chemical composition of the intermediate layer of the resonant element and on the magnitude and polarity of the current or voltage applied to the resonant element.

As shown in FIG. 18, the nanowires of the phase-modulation elements 1801-1804 are electronically coupled to voltage sources so that the resonant elements of each phase-modulation element can be individually and electronically addressed. The effective refractive indices of the resonant elements comprising the phase-modulation element 1801 are changed by applying the same voltage $V_3$ to the nanowires 1806-1808 and a different voltage $V_2$ to all three of the nanowires 1810-1812 resulting in the same voltage applied across each of the nine resonant elements of the phase-modulation element 1801. As a result, the effective refractive indices of the resonant elements comprising the phase-modulation element 1801 are changed to approximately the same effective refractive index, and electromagnetic radiation with the wavelength $\lambda_g$ is transmitted through the phase-modulation element 1801 and acquires a corresponding transmission phase shift, as described above with reference to FIG. 10. The phase-modulation elements 1802-1804 are separately and electronically addressed in a similar manner by applying different sets of voltages to corresponding nanowires to produce different effective refractive indices that result in transmission phase shifts in the wavelengths $\lambda_b$, $\lambda_g$, and $\lambda_r$, respectively.

FIG. 19A shows a cross-sectional view along a line 19A-19A, shown in FIG. 18, of the phase-modulation element 1801 and 1802 operated in accordance with embodiments of the present invention. Shaded resonant elements 1901 represent three of the nine resonant elements comprising the phase-modulation element 1801, and shaded resonant elements 1902 represent three of the nine resonant elements comprising the phase-modulation element 1802. FIG. 19B shows a cross-sectional view along a line 19B-19B, shown in FIG. 18, of the phase-modulation elements 1803 and 1804 operated in accordance with embodiments of the present invention. Shaded resonant elements 1903 represent three of the nine resonant elements comprising the phase-modulation element 1803, and shaded resonant elements 1904 represent three of the nine resonant elements comprising the phase-modulation element 1804.

Embodiments of the present invention are not limited to phase-modulation elements comprising a square array of nine resonant elements. Because voltages can be applied to individual crossed nanowires, the phase-modulation layer 1402 can be operated with phase-modulation elements ranging from as few as 4 to hundreds or even thousands of resonant elements. In addition, the individual nanowires enable phase-modulation elements to have various shapes such as square, rectangular, circular, elliptical, triangular, or any other suitable shape.

Figure 20:
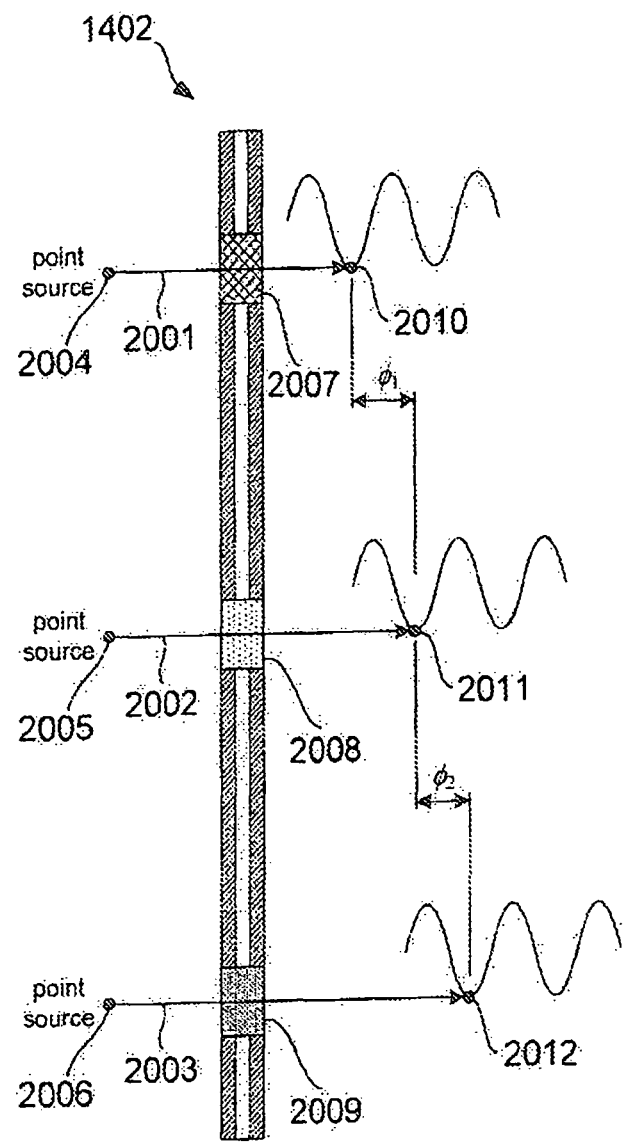
FIG. 20 shows a side view of electromagnetic radiation transmitted through three phase-modulation elements of a phase-control layer operated in accordance with embodiments of the present invention.

FIG. 20 shows a side view of electromagnetic radiation having one of the red, green, or blue wavelengths transmitted through three corresponding red, green, or blue phase-modulation elements of the phase-modulation layer 1402 operated in accordance with embodiments of the present invention. Rays of electromagnetic radiation 2001-2003 emanating from point sources 2004-2006 that generate the same wavelength pass through phase-modulation elements 2007-2009, respectively. In the example shown in FIG. 20, each phase-modulation element is electronically addressed, as described above with reference to FIG. 18, and has a different refractive index with phase-modulation element 2007 having the largest refractive index, phase-modulation element 2008 having the second largest refractive index, and phase-modulation element 2009 having the smallest refractive index. As rays 2001-2003 enter associated phase-modulation elements 2007-2009, the electromagnetic radiation slows to a velocity $v=c/n$ where v is the velocity of electromagnetic radiation propagating through a phase-modulation element, c is the speed of electromagnetic radiation in free space, and n is the magnitude of the effective refractive index of the phase-modulation element. Thus, the ray 2004 passing through the phase-modulation element 2007 has the slowest velocity, the ray 2005 passing through the phase-modulation element 2008 has the second slowest velocity, and the ray 2006 has the highest relative velocity. As shown in FIG. 20, points 2010-2012 represent points on electromagnetic waves that simultaneously enter the phase-modulation elements 2007-2009, respectively, but due to the different refractive indices at each phase-modulation element, the points 2010-2012 of the electromagnetic waves emerge at different times from the phase-modulation elements 2007-2009 and, therefore, are located at different distances from the phase-modulation layer 1402. In other words, the electromagnetic waves emerging from the phase-modulation elements 2007-2009 acquire transmission phase shifts. As shown in FIG. 20, the relative phase difference between the electromagnetic waves emerging from phase-modulation elements 2007 and 2008 is $\phi_1$, and the relative phase difference between electromagnetic waves emerging from phase-modulation elements 2008 and 2009 is $\phi_2$, with the greatest relative phase difference of $\phi_1+\phi_2$ for electromagnetic waves emerging from phase-modulation elements 2007 and 2009. The electronic signal applied to the phase-modulation elements 2007-2009 can be rapidly modulated, which, in turn, rapidly modulates the effective refractive indices of the phase-modulation elements 2007-2009 resulting in rapid changes in relative phase differences between rays emerging from the phase-modulation elements 2007-2009.

The red, green, and blue elements each produce three separate red, green, and blue holographic image components, each component corresponds to a separate red, green, and blue wavefront generated as described with reference to FIG. 20. The red, green, and blue components mix or combine at the pixel level such that a viewer perceives a color holographic image.

Figure 21C:
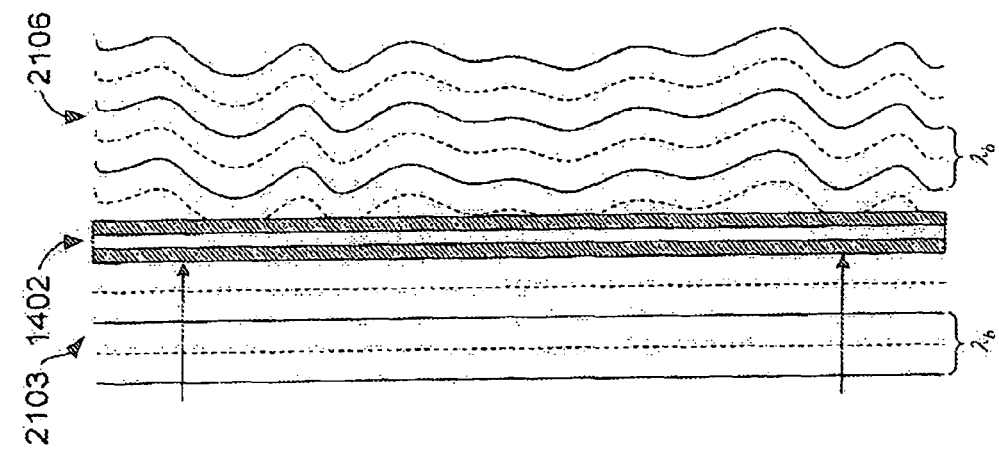
FIGS. 21A-21C show side views of separate wavefronts associated with three separate beams of light transmitted through a phase-control layer configured and operated in accordance with embodiments of the present invention.
Figure 21B:
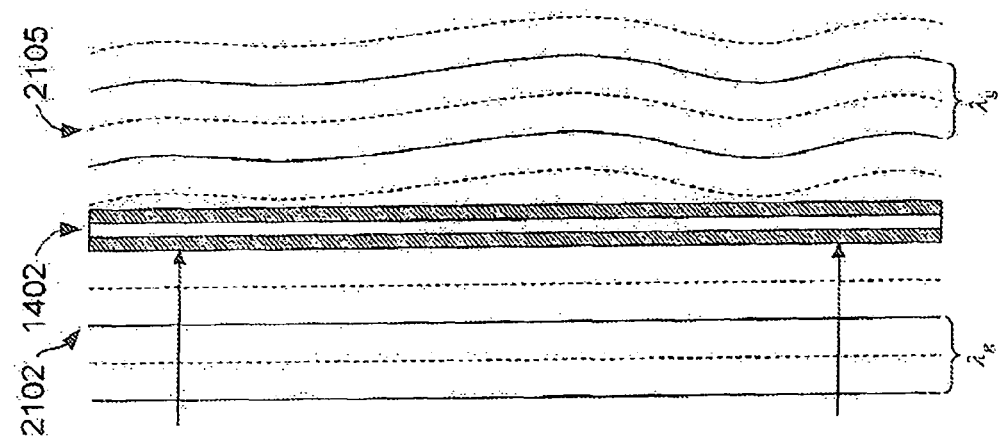
Figure 21A:
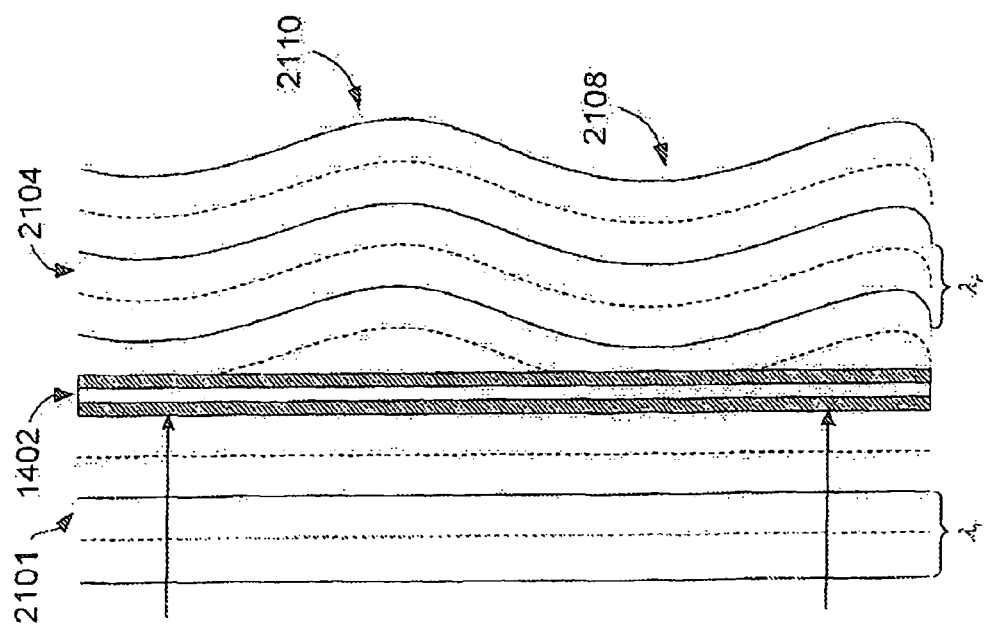

FIGS. 21A-21C shows a side view of separate wavefronts associated with three separate red, green, and blue beams of light entering and emerging from the phase-control layer 1402, respectively, in accordance with embodiments of the present invention. Ideally monochromatic light is used for each of three primary color wavelengths. However, in practice it is recognized that a light source does not emit true monochromatic light but instead can emit light in a narrow band of wavelengths, which is called "quasimonochomatic light." FIGS. 21A-21C show three separate quasimonochromatic red, green, and blue light uniform wavefronts 2101-2103 with wavelengths $\lambda_r$, $\lambda_g$, and $\lambda_b$, respectively. The uniform wavefronts 2101-2103 can be simultaneously generated by three separate light sources, such as three separate lasers with each laser generating a different wavelength. Each wavefront crest is identified by a solid line and each wavefront trough is identified by a dashed line. As shown in FIGS. 21A-21C, the wavefronts 2101-2103 enter the phase-control layer 1402 with substantially uniform wavefronts. The phase-modulation elements (not identified) of the phase-control layer 1402 are simultaneously and selectively electronically addressed to produce corresponding red, green, and blue non-uniform wavefronts 2104-2106 by changing the transmission phase of different portions of the uniform wavefronts 2101-2103, as described above with reference to FIGS. 18-20. In particular, the non-uniform wavefronts 2104-2106 result from portions of the incident uniform wavefronts 2101-2103 passing through associated phase-modulation color elements that have been electronically configured with relatively different refractive index magnitudes. For example, the non-uniform wavefront 2104 is produced by the uniform wavefront 2101 passing through the red elements, which are electronically addressed so that a portion of the wavefront 2104 in region 2108 emerges from certain red elements of the phase-control layer 1402 later than portions of the wavefront 2104 in region 2110. In other words, the phase-control layer 1402 is configured to introduce relatively large transmission phase differences between portions of wavefronts emerging in region 2108 and portions of the wavefront 2104 emerging in region 2110. In practice, in order to produce a three-dimensional color holographic image, all three beams 2101-2103 are simultaneously sent into the phase-control layer 1402. The wavefronts 2104-2106 are the red, green, and blue holographic image components. A viewer observing the phase-control layer 1402 perceives a color holographic image produced by the three separate wavelengths 2104-2106 mixing at the pixel level.

Returning to FIG. 14, in certain embodiments, the intensity-control layer 1404 can be a liquid crystal layer. The red, green, and blue wavelengths emerging from the phase-modulation elements of the phase-control layer 1402 pass through corresponding intensity-control elements of intensity-control layer 1404, as described above with reference to FIG. 14. The individual intensity-control elements of the intensity-control layer 1404 can be operated to vary the intensity of the red, green, and blue wavelengths transmitted through corresponding phase-modulation elements in order to produce substantially full color pixels. Each intensity-control element of intensity-control layer 1404 comprises of a layer of liquid crystal molecules aligned between two transparent electrodes, and two polarizing filters with substantially perpendicular axes of transmission. The electrodes are composed of a transparent conductor such as Indium Tin Oxide ("ITO"). Thus, with no liquid crystal filling the pixel between the polarizing filters, light passing through the first filter is blocked by the second filter. The surfaces of the transparent electrodes contacting the liquid crystal material are treated with a thin polymer molecule that aligns the liquid crystal molecules in a particular direction.

Before applying an electric field to a pixel, the orientation of the liquid crystal molecules is determined by the alignment at the polymer deposited on surfaces of the tranparent electrode. An intensity-control element comprising twisted nematic liquid crystals, the surface alignment direction of the polymer on the first electrode is substantially perpendicular to the alignment direction of the polymer on the second electrode, and the liquid crystal molecules between the electrodes arrange themselves in a helical structure. Because the liquid crystal is birefringent, light passing through one polarizing filter is rotated by the liquid crystal helix allowing the light to pass through the second polarized filter.

When a voltage is applied across the electrodes of an intensity-control element, a torque is created that aligns the liquid crystal molecules parallel to the electric field, distorting the helical structure. This reduces the rotation of the polarization of the incident light, and the pixel appears opaque. When the applied voltage is large enough, the liquid crystal molecules are almost completely untwisted and aligned with the electric field, and the polarization of the incident light is not rotated as it passes through the liquid crystals. This light will then be mainly polarized perpendicular to the second filter, and as a result, the light is blocked by the second filter and the pixel appears black. By controlling the voltage level applied to each intensity-control element, the intensity of light passing through each intensity-control element can be varied thus constituting different intensity levels.

Figure 22:
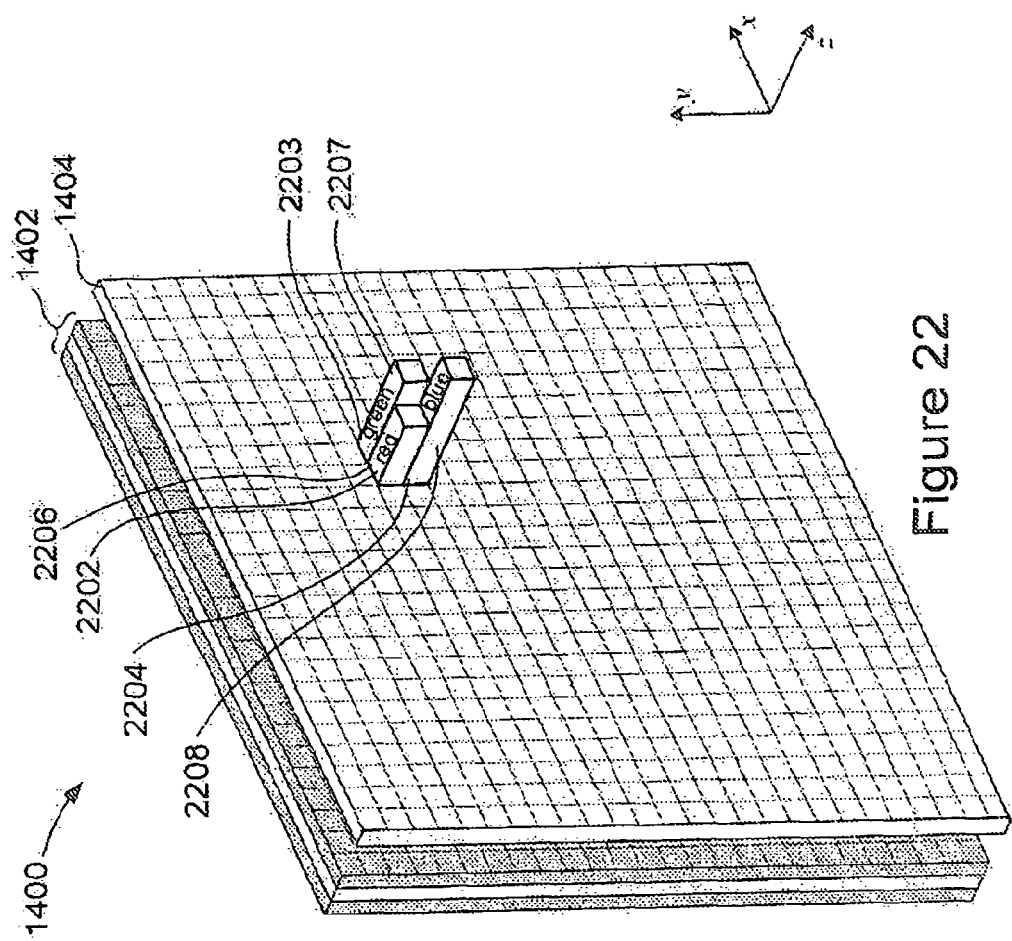
FIG. 22 shows intensity levels associated with red, green, and blue wavelengths passing through intensity-control elements of an intensity-control layer in accordance with embodiments of the present invention.

FIG. 22 shows intensity levels associated with red, green, and blue wavelengths passing through phase-modulation elements of phase-control layer 1402 and corresponding intensity-control elements of intensity-control layer 1404 in accordance with embodiments of the present invention. The red, green, and blue wavelengths emerging from phase-modulation elements in phase-control layer 1402 pass through intensity-control elements 2202-2204 that are each configured to produce a different intensity level. As shown in FIG. 22, bars 2206-2008 represent red, green, and blue intensity levels associated with a single color pixel. To a viewer positioned a distance away from the hologram 1400, the light emerging from the intensty-control elements 2202-2204 is mixed or combined and therefore, the perceives a single color pixel rather than the individual colors comprising the pixel.

Figure 23:
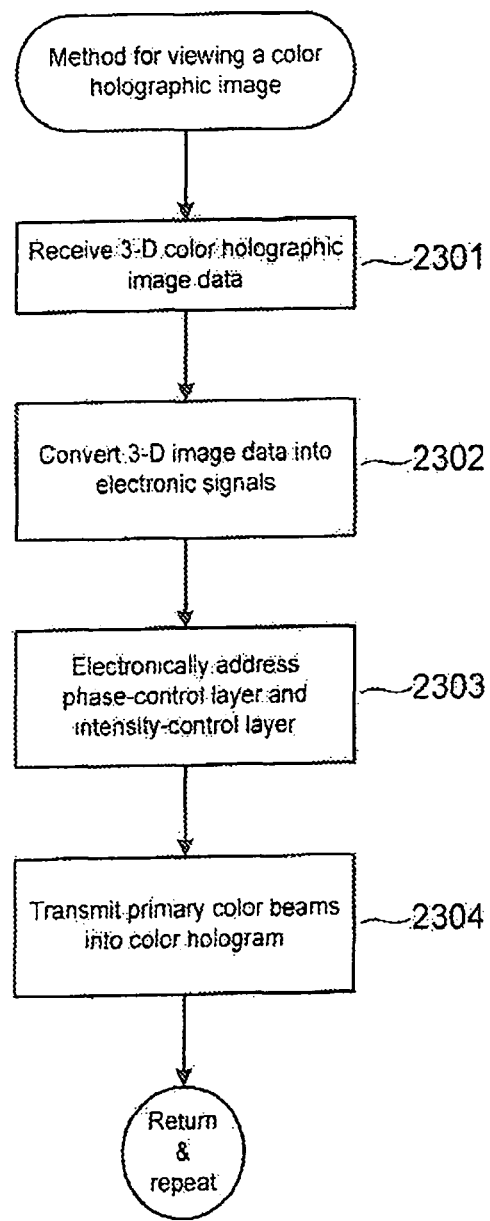
FIG. 23 shows a control-flow diagram of a method for viewing a color holographic image in accordance with embodiments of the present invention.

FIG. 23 shows a control-flow diagram of a method for viewing a color holographic image in accordance with embodiments of the present invention. In step 2301, three-dimensional color holographic image data is received from memory, another electronic data storage device, or any three-dimensional color holographic image generating method or system. For example, the color holographic image data can be generated by a CAD program or any other suitable application. In step 2302, the three-dimensional color holographic image data associated with each phase-modulation element and intensity-control element is converted into appropriate corresponding electronic signals that can be applied to phase-modulation elements and the intensity-control elements, as described above with reference to FIG. 14-22. In step 2303, the electronic signals are applied to the phase-modulation elements of the phase-modulation layer 1402 and the intensity-control elements of the intensity-control layer 1404, as described above with reference to FIGS. 18 and 22. In step 2304, three separate primary color beams are generated and transmitted through the hologram 1400. Note that in other embodiments, because the phase-modulation elements pass only a limited range of red, green, and blue wavelengths, a while light source can also be used.

The hologram 1400 can be operated by a computing device that allows a user to electronically address each resonant element as described above with reference to FIG. 17. In practice, the computing device can be any electronic device, including, but not limited to: a desktop computer, a laptop computer, a portable computer, a display system, a computer monitor, a navigation system, a personal digital assistant, a handheld electronic device, an embedded electronic device, or an appliance.

Figure 24:
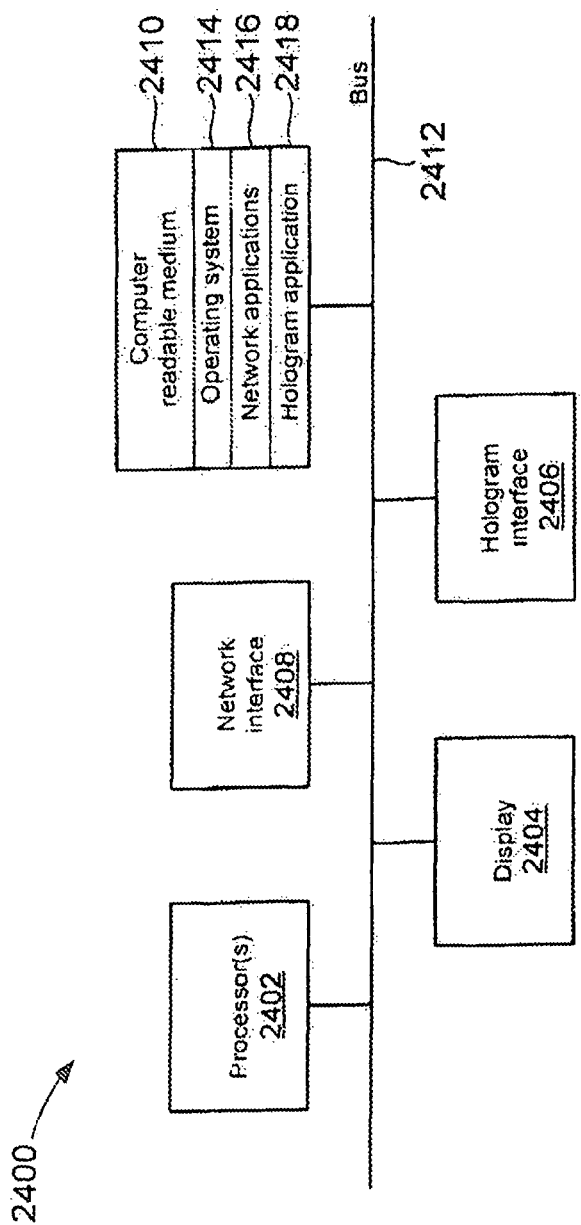
FIG. 24 shows a schematic representation of a computing device configured in accordance with embodiments of the present invention.

FIG. 24 shows a schematic representation of a computing device 2400 configured in accordance with embodiments of the present invention. The system 2400 includes one or more processors 2402, such as a central processing unit; one or more display devices 2404, such as a monitor; a hologram 1400 interface 2406; one or more network interfaces 2408, such as a USB port, an Ethernet, or FireWire port; one or more computer-readable mediums 2410. Each of these components is operatively coupled to one or more buses 2412. For example, the bus 2412 can be an EISA, a PCI, a USB, a FireWire, a NuBus, or a PDS.

The computer readable medium 2410 can be any medium that participates in providing instructions to the processor 2402 for execution and storage of data regarding electronically addressing the layers 1402 and 1404 of the hologram 1400. For example, the computer readable medium 2410 can be non-volatile media, such as an optical or a magnetic disk; volatile media, such as memory; and transmission media, such as coaxial cables, copper wire, and fiber optics. Transmission media can also take the form of acoustic, electromagnetic radiation, or radio frequency waves. The color holographic image data can be stored in the computer readable medium 2410. The image data includes ranges for each primary color and may be quantified in several different ways and stored as a numerical value. For example, a primary color can range from "0" to "1," with "0" corresponding to no color represented, "1" corresponding to the full primary color intensity, and any fractional value in between. This reprentation can be used in systems that use floating-point representations for primary color intensities. In computing, 256 intensities associated with each color band can be stored as an integer ranging from "0" to "255," which is the range offered by a single 8-bit byte. For example, the red, green, and blue triplets (255,0,255) and (255,255,0) represent magenta and yellow pixels, respectively. For relatively higher-end digital imaging systems, the integer range 0 to 65,535 can be used for each color band, which is the range a single 16-bit word can represent.

The computer-readable medium 2410 also includes an operating system 2414, such as Mac OS, Windows, Unix, and Linux; a network communications module 2416; and a hologram application 2418. The operating system 2414 can be multi-user, multiprocessing, multitasking, multithreading, real-time and the like. The operating system 2414 can also perform basic tasks such as recognizing input from input devices, such as a keyboard or a keypad; sending output to the display 2404; keeping track of files and directories on medium 2410; controlling peripheral devices, such as disk drives, printers, and the phase-control layer 1402; and managing traffic on the one or more buses 2412. The network applications 2416 includes various components for establishing and maintaining network connections, such as software for implementing communication protocols including TCP/IP, HTTP, Ethernet, USB, and FireWire. The computer readable medium 2410 can also store other software applications, including word processors, browsers, e-mail, Instant Messaging, and media players.

The hologram application 2418 provides various software components for enabling electronic addressing of resonant elements of the phase-control layer 1402, as described above with reference to FIG. 18. In certain embodiments, some or all of the processes performed by the application 2418 can be integrated into the operating system 2414. In certain embodiments, the processes can be at least partially implemented in digital electronic circuitry, or in computer hardware, firmware, software, or in any combination thereof.

Figure 25:
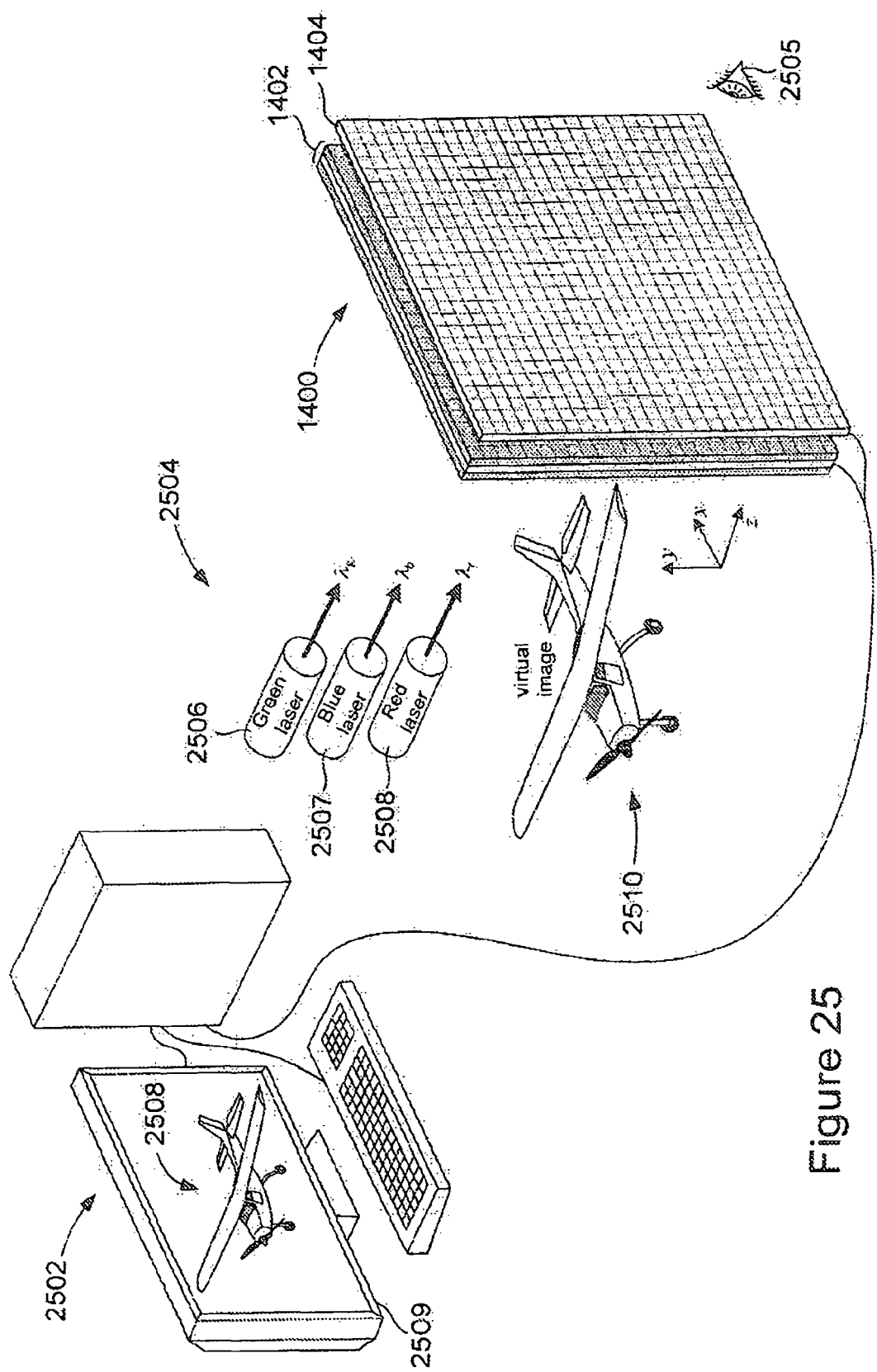
FIG. 25 shows an example of a system for generating a three-dimensional color holographic image in accordance with embodiments of the present invention.

FIG. 25 shows an example of a system for generating a three-dimensional color holographic image in accordance with embodiments of the present invention. The system comprises a desktop computer 2502, the hologram 1400, and a light source 2504 comprising three separate green, blue, and red lasers 2506-2508. In other embodiments, the light source 2504 can be a white light source. The computer 2502 includes a processor and memory that processes and stores the data representing various images of objects and scenes. The images are stored in the memory as data files comprising three dimensional coordinates and associated intensity and color values. A three dimensional image of an object can be displayed on one side of the hologram 1400 as follows. The light source 2504 is positioned and configured to emit quasimonochromatic light that passes through the electronically addressed hologram 1400, as described above with reference to FIGS. 14-23. A program stored on the computer system memory displays the image as a three-dimension object by translating the data files into electronic addresses that are applied to particular phase-modulation and intensity-control elements of the layers 1402 and 1404. Light passing through each phase-modulation and associated intensity-control element acquires an appropriate transmission phase and intensity in order to reproduce the wavefront reflected by the object and intensty mapping over a range of viewing angles. As a result, the image stored in the computer is perceived by a viewer 2505 as a virtual three-dimensional color holographic image of an object suspended behind the hologram 1400. For example, as shown in FIG. 25, the computer 2502 displays a two-dimensional image of an airplane 2508 on a monitor 2509 and displays a virtual three-dimensional color holographic image 2510 of the same airplane on the side of the hologram 1400 opposite the viewer 2505. The viewer 2505 looking at the hologram 1400 perceives the airplane 2510 in depth by varying the position of her head or changing her perspective of the view.

In other embodiments, two or more color holographic images can be displayed. In addition, because the hologram 1400 is dynamically controlled and can be rapidly changed, color holographic motion pictures can also be displayed.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A dynamically reconfigurable hologram comprising:
a phase-control layer having a plurality of phase-modulation elements, wherein each phase-modulation element is configured to have a selectable effective refractive index and selectively transmit wavelengths associated with one of three primary color wavelength bands of the visible spectrum, wherein the selectable effective refractive index comprises a negative effective refractive index; and
an intensity-control layer having a plurality of intensity-control elements, wherein each of the plurality of intensity-control elements is configured to have a selectable transparency to control an intensity of light transmitted through a respective intensity-control element of the plurality of intensity-control elements, wherein one or more color three-dimensional holographic images are produced by electronically addressing the phase-modulation elements and intensity-control elements to produce wavefronts and control the intensity of light transmitted through the hologram;
wherein the phase-control layer further comprises:
a first layer of approximately parallel nanowires, each nanowire having substantially regularly spaced fingers;
a second layer of approximately parallel nanowires that overlay the nanowires in the first layer, each nanowire having substantially regularly spaced fingers, wherein the nanowires in the first layer are approximately perpendicular in orientation to the nanowires in the second layer; and
resonant elements at nanowire intersections, wherein each resonant element includes two fingers of a nanowire in the first layer and two fingers of a nanowire in the second layer and one or more adjacent resonant elements form a phase-modulation element.

2. The hologram of claim 1 wherein the phase-control layer further comprises:
where fingers of adjacent nanowires within the same layer are substantially aligned, notches between fingers of nanowires in the first layer are substantially aligned with notches between fingers of the nanowires in the second layer, and the cross-sectional dimensions of the nanowires in the first layer are relatively larger than the cross-sectional dimensions of the nanowires in the second layer.

3. The hologram of claim 1 wherein the intensity-control layer further comprises a liquid crystal layer.

4. The hologram of claim 1 wherein the phase-control layer further comprises an intermediate layer sandwiched between the first and second nanowires layer and is configured as one of:
resistor;
semiconductor p-n junction; and
nonvolatile memristor.

5. The hologram of claim 1 wherein a set of three or more of the plurality of phase-modulation elements are configured to operate as a color pixel, wherein the selectable effective refractive index of each of the set of three or more phase-modulation elements comprises a negative effective refractive index for wavelengths in one of three primary color wavelength bands of the visible spectrum.

6. The hologram of claim 1 wherein the phase-modulation elements further comprise one or more memristor crossbar junctions.

7. The hologram of claim 1 wherein the phase-modulation elements further comprise one or more p-n crossbar junctions.

8. A method for generating a color holographic image using a hologram, the method comprising:
converting three-dimensional color holographic image data of a color holographic image into electronic signals using a computing device;
applying the electronic signals to phase-modulation elements of a phase-control layer and intensity-control elements of the hologram using the computing device, wherein each phase-modulation element is configured to have a selectable effective refractive index for wavelengths in one of three primary color wavelength bands of the visible spectrum, wherein the selectable effective refractive index comprises a negative effective refractive index and wherein each of the of intensity-control elements is configured to have a selectable transparency to control an intensity of light transmitted through a respective intensity-control element of the intensity-control elements,
addressing the phase-modulation elements and intensity-control elements to produce wavefronts and to control the intensity of light transmitted through the hologram to electronically produce one or more color three-dimensional holographic images; and
transmitting light comprising wavelengths in the primary color wavelength bands through the hologram to generate the color holographic image,
wherein the phase-control layer further comprises:
a first layer of approximately parallel nanowires, each nanowire having substantially regularly spaced fingers;
a second layer of approximately parallel nanowires that overlay the nanowires in the first layer, each nanowire having substantially regularly spaced fingers, wherein the nanowires in the first layer are approximately perpendicular in orientation to the nanowires in the second layer; and
resonant elements at nanowire intersections, wherein each resonant element includes two fingers of a nanowire in the first layer and two fingers of a nanowire in the second layer and one or more adjacent resonant elements form a phase-modulation element.

9. The method of claim 8 further comprises receiving the three-dimensional color holographic image data from memory of the computing device, another electronic data storage device, or any three-dimensional color holographic image generating method or computing device.

10. The method of claim 8 wherein applying the electronic signals to the phase-modulation elements further comprises:
selectively applying a first set of the electronic signals to the nanowires in the first layer of nanowires of the phase-control layer of the hologram using the computing device; and
selectively applying a second set of the electronic signals to the nanowires in the second layer of nanowires of the phase-control layer using the computing device such that the electronic signals change the effective refractive indices of resonant elements of the phase-modulation elements.

11. The method of claim 8 wherein the three-dimensional holographic image data further comprises three-dimensional motion picture data.

12. The method of claim 8 wherein the color holographic image further comprises a three-dimensional motion picture.

13. A system for generating a color holographic image, the system comprising:
a computing device including a processor and a computer readable medium;
a dynamically reconfigurable hologram coupled to the computing device, the hologram comprising:
a phase-control layer having a plurality of phase-modulation elements, wherein each phase-modulation element is configured to have a selectable effective refractive index and selectively transmit wavelengths associated with one of three primary color wavelength bands of the visible spectrum, wherein the selectable effective refractive index comprises a negative effective refractive index;
an intensity-control layer having a plurality of intensity-control elements, wherein each of the plurality of intensity-control elements is configured to have a selectable transparency to control an intensity of light transmitted through a respective intensity-control element of the plurality of intensity-control elements, wherein one or more color three-dimensional holographic images are produced by electronically addressing the phase-modulation elements and intensity-control elements to produce wavefronts and control the intensity of light transmitted through the hologram;
wherein the phase-control layer further comprises:
a first layer of approximately parallel nanowires, each nanowire having substantially regularly spaced fingers;
a second layer of approximately parallel nanowires that overlay the nanowires in the first layer, each nanowire having substantially regularly spaced fingers, wherein the nanowires in the first layer are approximately perpendicular in orientation to the nanowires in the second layer; and
resonant elements at nanowire intersections, wherein each resonant element includes two fingers of a nanowire in the first layer and two fingers of a nanowire in the second layer and one or more adjacent resonant elements form a phase-modulation element; and
a light source positioned and configured to emit light transmitted through the hologram, wherein the processor converts three-dimensional color holographic image data of a color holographic image stored in the computer readable medium into electronic signals, the computing device applies the electronic signals to the phase-modulation elements and intensity-control elements of the hologram to adjust the selectable effective refractive index of the phase-modulation elements and the selectable transparency of the intensity-control elements such that a viewer perceives the color holographic image.

14. The system of claim 13 wherein the light source further comprises one of:
three separate light sources, each light source emitting wavelengths in one of three primary color wavelength bands of the color spectrum; and
a light source emitting white light.

15. The hologram of claim 1, wherein the selectable effective refractive index of each of the plurality of phase-modulation elements further comprises a positive effective refractive index.

* * * * *

UNITED STATES PATENT AND TRADEMARK OFFICE
CERTIFICATE OF CORRECTION

| | | |
|---|---|---|
| PATENT NO. | : 8,797,382 B2 | Page 1 of 1 |
| APPLICATION NO. | : 13/264073 | |
| DATED | : August 5, 2014 | |
| INVENTOR(S) | : Jingjing Li et al. | |

It is certified that error appears in the above-identified patent and that said Letters Patent is hereby corrected as shown below:

In the Claims

Column 23, line 17, in Claim 8, delete "the of" and insert -- the plurality of --, therefor.

Signed and Sealed this
Tenth Day of February, 2015

Michelle K. Lee
*Deputy Director of the United States Patent and Trademark Office*